US010235939B2

(12) United States Patent
Kimura et al.

(10) Patent No.: US 10,235,939 B2
(45) Date of Patent: Mar. 19, 2019

(54) LIGHT EMITTING ELEMENT DISPLAY DEVICE

(71) Applicant: Japan Display Inc., Tokyo (JP)

(72) Inventors: Hiroyuki Kimura, Tokyo (JP); Seiichiro Jinta, Tokyo (JP)

(73) Assignee: Japan Display Inc., Tokyo (JP)

( * ) Notice: Subject to any disclaimer, the term of this patent is extended or adjusted under 35 U.S.C. 154(b) by 363 days.

(21) Appl. No.: 15/070,984

(22) Filed: Mar. 15, 2016

(65) Prior Publication Data

US 2016/0275870 A1 Sep. 22, 2016

(30) Foreign Application Priority Data

Mar. 19, 2015 (JP) ................................ 2015-056097

(51) Int. Cl.
*G06F 3/038* (2013.01)
*G09G 3/3258* (2016.01)

(52) U.S. Cl.
CPC ... *G09G 3/3258* (2013.01); *G09G 2300/0452* (2013.01); *G09G 2300/0804* (2013.01); *G09G 2310/061* (2013.01); *G09G 2320/0257* (2013.01); *G09G 2320/045* (2013.01)

(58) Field of Classification Search
CPC ......... G09G 3/3258; G09G 2300/0804; G09G 2300/0452; G09G 2320/045; G09G 2320/0257; G09G 2310/061; H01L 2251/50; H01L 2251/53; H01L 2251/56; H02M 2001/0032; H02M 1/096
See application file for complete search history.

(56) References Cited

U.S. PATENT DOCUMENTS

2004/0090186 A1* 5/2004 Yoshida ............... G09G 3/3233 315/169.1
2007/0268210 A1 11/2007 Uchino et al.
(Continued)

FOREIGN PATENT DOCUMENTS

JP 2007310311 A 11/2007
JP 2008-233122 A 10/2008
JP 2010-128183 A 6/2010
(Continued)

OTHER PUBLICATIONS

Japanese Office Action dated Sep. 4, 2018, for the corresponding Japanese Patent Application No. 2015-056097, with machine generated English translation.

*Primary Examiner* — Nelson Rosario
*Assistant Examiner* — Andrew Lee
(74) *Attorney, Agent, or Firm* — Typha IP LLC

(57) ABSTRACT

A light emitting element display device with a narrow frame and high light emission efficiency is provided even when high definition is achieved. The light emitting element display device includes: a light emitting element which emits light at each of a plurality of subpixels forming one pixel; a drive transistor in which one of a source and a drain is connected to an anode of the light emitting element; and an output control circuit which selectively sets the other of the source and the drain of the drive transistor into one of a state of being connected to a power-supply voltage, a state of being connected to a reset voltage that is a lower voltage than the power-supply voltage, and a high-impedance state of not being connected to any of these voltages.

23 Claims, 20 Drawing Sheets

(56) References Cited

U.S. PATENT DOCUMENTS

| | | | | |
|---|---|---|---|---|
| 2009/0102760 | A1* | 4/2009 | Yamashita | G09G 3/3233 345/76 |
| 2010/0188384 | A1 | 7/2010 | Uchino et al. | |

FOREIGN PATENT DOCUMENTS

| | | | |
|---|---|---|---|
| JP | 2011-164133 | A | 8/2011 |
| JP | 2014-102321 | A | 6/2014 |
| JP | 2014-142560 | A | 8/2014 |
| WO | 2012/008232 | A1 | 1/2012 |

* cited by examiner

LIGHT EMITTING ELEMENT DISPLAY DEVICE

CROSS-REFERENCE TO RELATED APPLICATION

The present application claims priority from Japanese application JP2015-056097 filed on Mar. 19, 2015, the content of which is hereby incorporated by reference into this application.

BACKGROUND OF THE INVENTION

1. Field of the Invention

The present invention relates to a light emitting element display device.

2. Description of the Related Art

Recently, a light emitting element display device such as an organic EL (electro-luminescent) display device using a self-emitting element called OLED (organic light emitting diode) has been in practical use. Compared with conventional liquid crystal display devices, the light emitting element display device not only achieves high visibility and response speed because of its use of a self-emitting element but also can be reduced further in thickness because it requires no auxiliary lighting device such as backlight.

JP 2007-310311 A discloses a light emitting element display device which has a threshold voltage correction function and a mobility correction function with a simple circuit, thus achieving high definition.

SUMMARY OF THE INVENTION

The configuration disclosed in JP 2007-310311 A is advantageous in that both the correction of threshold voltage and the correction of mobility can be carried out. However, in such a configuration, switching of the power-supply voltage is necessary. Therefore, the drive circuit needs to have a lower resistance and this causes an increase in the scale of the drive circuit. Consequently, there is a risk of an increase in a frame area which is formed around the display area and where the drive circuit is arranged. Also, the width of the wiring needs to be wider in order to reduce the resistance of the wiring, and consequently there is a risk of a reduction in the aperture ratio of each pixel and hence a reduction in light emission efficiency.

In view of the foregoing circumstances, the invention is to provide a light emitting element display device which has a narrow frame and high light emission efficiency even if high definition is achieved.

According to an aspect of the invention, a light emitting element display device includes: a light emitting element which emits light at each of a plurality of subpixels forming one pixel; a drive transistor in which one of a source and a drain is connected to an anode of the light emitting element; and an output control circuit which selectively sets the other of the source and the drain of the drive transistor into one of a state of being connected to a power-supply voltage, a state of being connected to a reset voltage that is a lower voltage than the power-supply voltage, and a high-impedance state of not being connected to any of these voltages.

According to another aspect of the invention, a light emitting element display device includes: a plurality of pixel portions which includes a light emitting element and a pixel circuit for supplying a drive current to the light emitting element and which is arranged in the form of a matrix on a substrate; a plurality of scanning lines arranged along rows where the pixel portions are arrayed; a plurality of video signal lines arranged along columns where the pixel portions are arrayed; a plurality of reset lines arranged along the rows where the pixel portions are arrayed; a high-potential power line and a low-potential power line; a scanning line drive circuit which supplies a control signal successively to the plurality of scanning lines; and a signal line drive circuit which supplies a video voltage signal to the video signal lines. The pixel circuit has a drive transistor which is connected in series to the light emitting element between the low-potential power line and the high-potential power line and which has a first terminal connected to the light emitting element. The pixel circuit further includes a reset control switch which is arranged in series between a second terminal of the drive transistor and the reset line, and a control switch which is arranged in series between the reset control switch and the drive transistor and which controls whether to supply a high-potential voltage from the high-potential power line to the drive transistor or not, and whether to supply a reset signal from the reset line to the drive transistor or not.

DETAILED DESCRIPTION OF THE INVENTION

Hereinafter, each embodiment of the invention will be described with reference to the drawings. The disclose is only an example and any changes that a person skilled in the art can readily think of while maintaining the point of the invention should be included in the scope of the invention. In order to clarify the explanation, the drawings may schematically depict the width, thickness, shape and the like of each part, compared with its actual implementation. However, this is only an example and should not limit the interpretation of the invention. In this specification and the drawings, components similar to those described with reference to previously mentioned drawings are denoted by the same reference numbers and detailed description of these components may be omitted according to need.

First Embodiment

Figure 1:
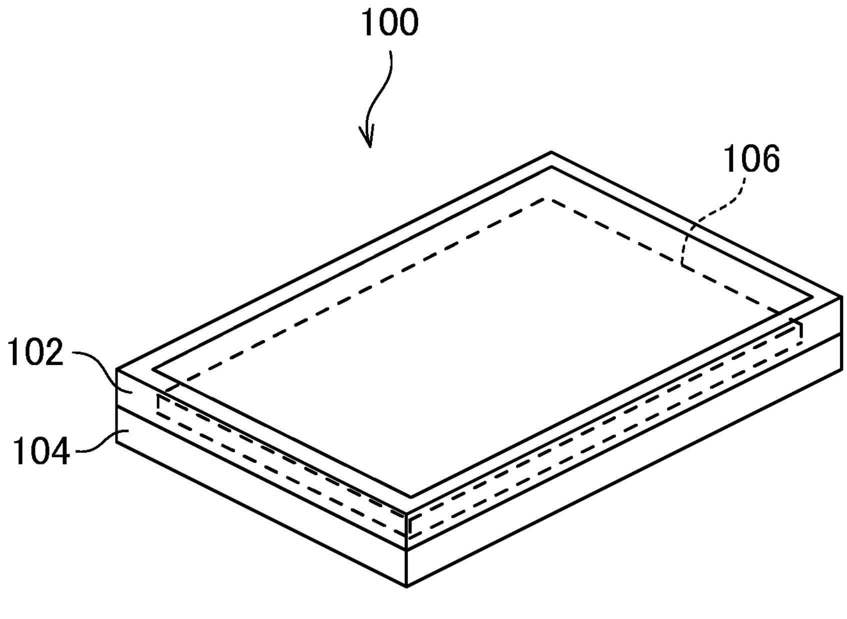
FIG. 1 schematically shows an organic EL display device as a light emitting element display device according to a first embodiment of the invention.

FIG. 1 schematically shows an organic EL display device 100 according to a first embodiment of the light emitting element display device according to the invention. As shown in FIG. 1, the organic EL display device 100 includes an organic EL panel 106 fixed to be held between a top frame 102 and a bottom frame 104.

Figure 2:
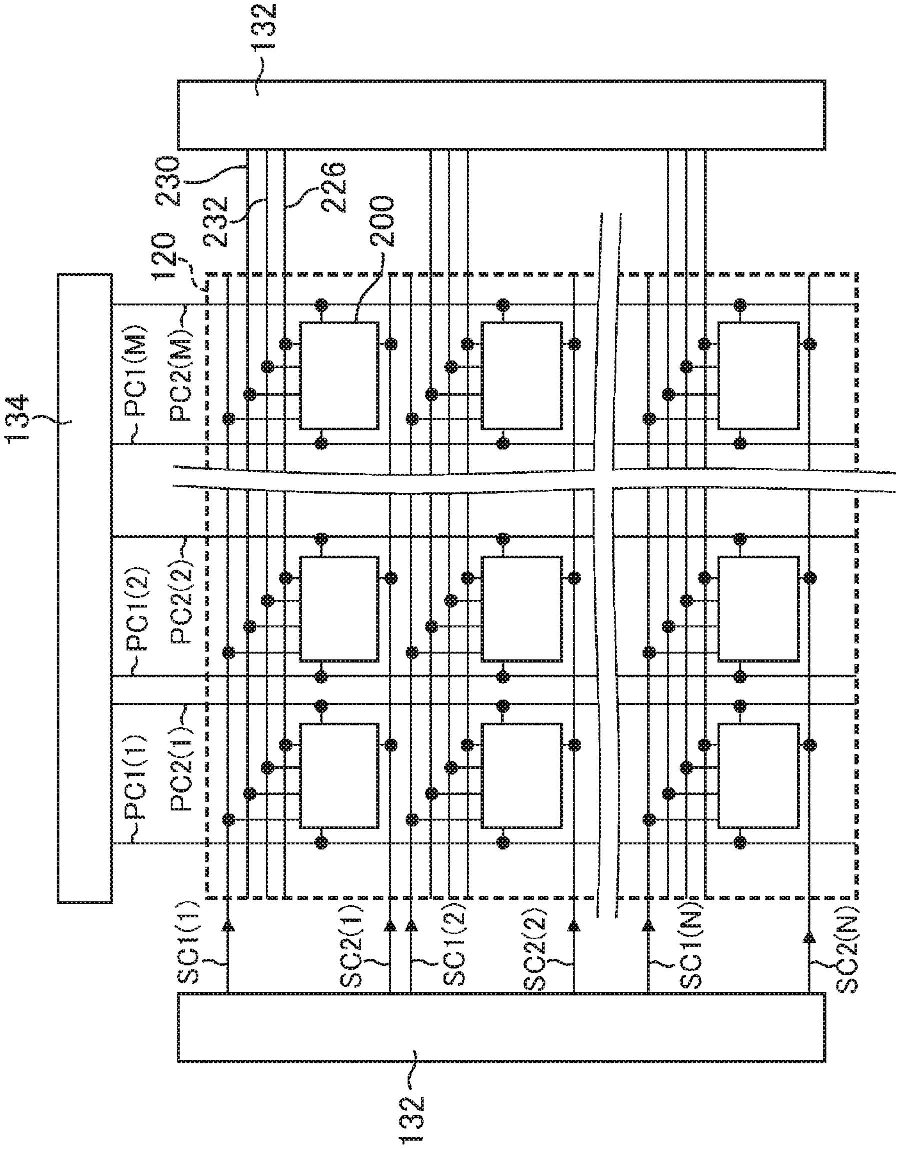
FIG. 2 schematically shows a circuit formed on a TFT substrate that forms the organic EL panel of FIG. 1.

FIG. 2 schematically shows a circuit formed on a TFT (thin film transistor) substrate that forms the organic EL panel 106 of FIG. 1. As shown in FIG. 2, the circuit formed on the TFT substrate includes a circuit formed in a display area 120 where a plurality of pixels 200 is arranged in the form of a matrix, and a scanning line drive circuit 132 and a video line drive circuit 134 arranged outside the display area 120 and configured to cause each pixel to emit light with a predetermined gradation value. The scanning line drive circuit 132 is arranged at two positions to the left and right of the display area 120. From the scanning line drive circuit 132 on the left side, first scanning lines SC1(1) to SC1(N) and second scanning lines SC2(1) to SC2(N) (N being a natural number corresponding to the number of pixel rows) extend. From the scanning line drive circuit 132 on the right side, a power-supply control gate signal line 230, a reset signal line 232 and a control signal line 226 extend. From the video line drive circuit 134, first video lines PC1(1) to PC1(M) and second video lines PC2(1) to PC2(M) (M being a natural number corresponding to the number of pixel columns) extend. The first scanning line SC1, the second scanning line SC2, the first video line PC1, the second video line PC2, the power-supply control gate signal line 230, the reset signal line 232 and the control signal line 226 extend to each pixel 200 and each corresponding signal is applied. The role of the signal applied to each signal line will be described in detail later with reference to the circuit diagram of FIG. 3.

In this embodiment, the scanning line drive circuit 132 and the video line drive circuit 134 are circuits within an IC (integrated circuit) arranged on the TFT substrate. However, these circuits may be directly formed on the substrate. Also, while the scanning line drive circuit 132 is arranged to both the left and right of the display area 120 in this embodiment, the scanning line drive circuit 132 may be arranged on one side only, or any signal line may extend from either one of the scanning line drive circuits 132 arranged on both sides.

Figure 3:
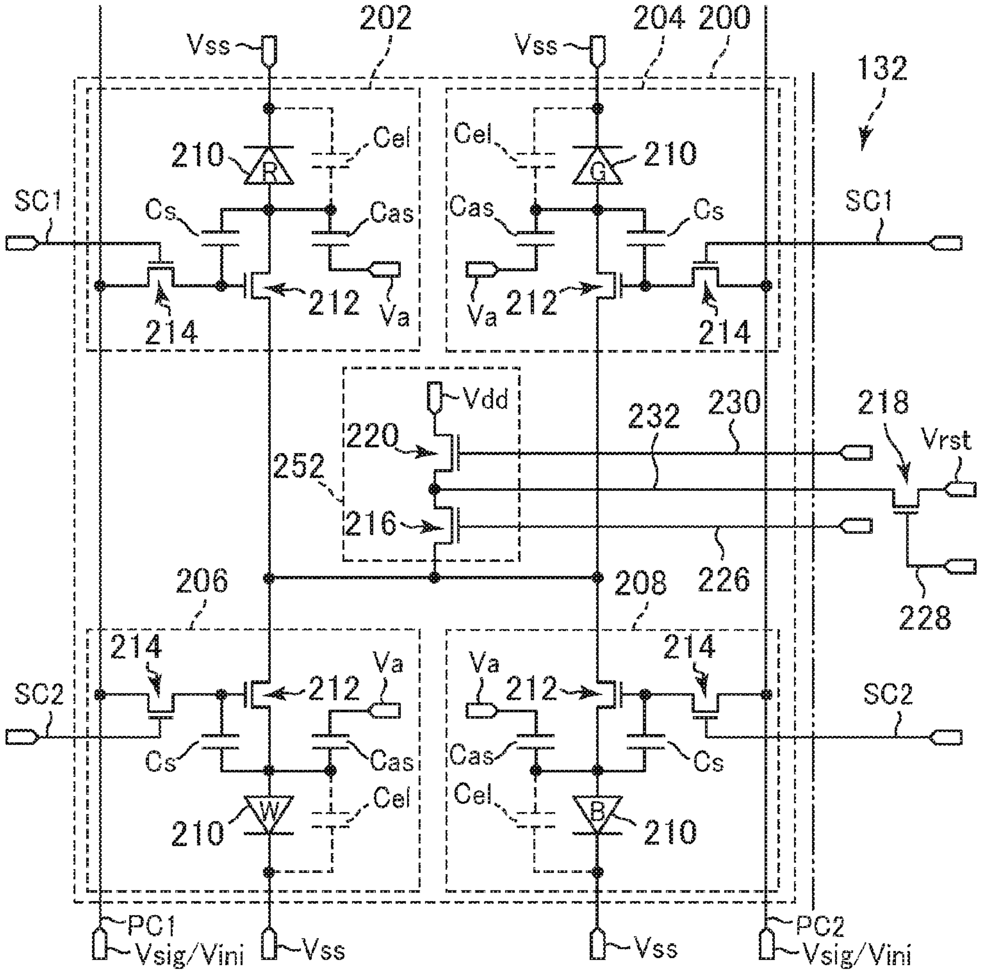
FIG. 3 is a circuit diagram showing details of a circuit within a pixel of FIG. 2.

FIG. 3 is a circuit diagram showing details of a circuit within the pixel 200 of FIG. 2. As shown in FIG. 3, the pixel 200 is made up of four subpixels, that is, an R (red) subpixel 202, G (green) subpixel 204, a B (blue) subpixel 208, and a W (white) subpixel 206. The subpixels are arrayed in two rows by two columns in such a way that two sides of each subpixel lie next to other subpixels in the same pixel 200, thus forming the one pixel 200.

Next, a circuit within each subpixel will be described. The circuits within the RGBW subpixels have the same circuit configuration except that the light emission colors of their respective light emitting elements 210 are different from each other. Each subpixel has: a light emitting element 210 made up of an organic layer having a light emitting layer, or the like; a drive transistor 212 in which one of the source and drain (hereinafter simply referred to as the "source") is connected to the anode side of the light emitting element 210; a storage capacitor Cs forming a capacitance between the gate of the drive transistor 212 and the anode side of the light emitting element 210; and a pixel transistor 214 which is a transistor controlling electrical continuity between the gate of the drive transistor 212 and the first video line PC1 or the second video line PC2 by high/low of the first scanning line SC1 in order to cause the storage capacitor Cs to hold a voltage corresponding to the gradation value. Moreover, the anode side of the light emitting element 210 forms an auxiliary capacitor Cas to a power supply Va. This power supply Va has a positive power-supply voltage Vdd. The power supply Va may have a different voltage. If the power supply Va has a negative power-supply voltage Vss or the like, the auxiliary capacitor Cas may be formed between the anode side of the light emitting element 210 and the negative power-supply voltage Vss or another potential. A light emitting element capacitor Cel represents the parasitic capacitance between the anode and cathode of the light emitting element 210. Also, the cathode of the light emitting element 210 is connected to the negative power-supply voltage Vss. Here, for example, the positive power-supply voltage Vdd can be the potential of approximately 10 volt (V) and the negative power-supply voltage Vss can be the potential of approximately 1.5 V.

The other of the source and drain (simply referred to as the "drain") of the drive transistor 212 of each of the subpixels 202, 204, 206 and 208 in the pixel 200 is connected to the output end of an output control circuit 252, which is the only one formed in the pixel 200. In the output control circuit 252, the output end is connected to a positive power-supply voltage Vdd, which is a power source for causing each light emitting element 210 to emit light, via a control transistor 216 and a power supply control transistor 220, which are transistors. The control signal line 226 and the power-supply control gate signal line 230 to which a signal is applied in the scanning line drive circuit 132 outside the display area 120 are connected to the gate of the control transistor 216 and the gate of the power supply control transistor 220, respectively. Between the control transistor 216 and the power supply control transistor 220, the reset signal line 232 to which a signal is applied in the scanning line drive circuit 132 is connected. The scanning line drive circuit 132 has a reset transistor 218 which controls whether to apply a reset voltage Vrst to the reset signal line 232 or not, by high/low switching of a reset transistor gate signal line 228. The reset voltage Vrst can be, for example, approximately −2 V.

By the output control circuit 252, the positive power-supply voltage Vdd and the reset voltage Vrst can be applied to the drain of the drive transistor 212 of each subpixel. Also, by the control transistor 216, both of these voltages can be disconnected and the drain of the drive transistor 212 can be set in a high-impedance state. The circuit configuration of the subpixels according to this embodiment is only an example, and any circuit that can control light emission of the light emitting element 210 can be used.

Figure 4:
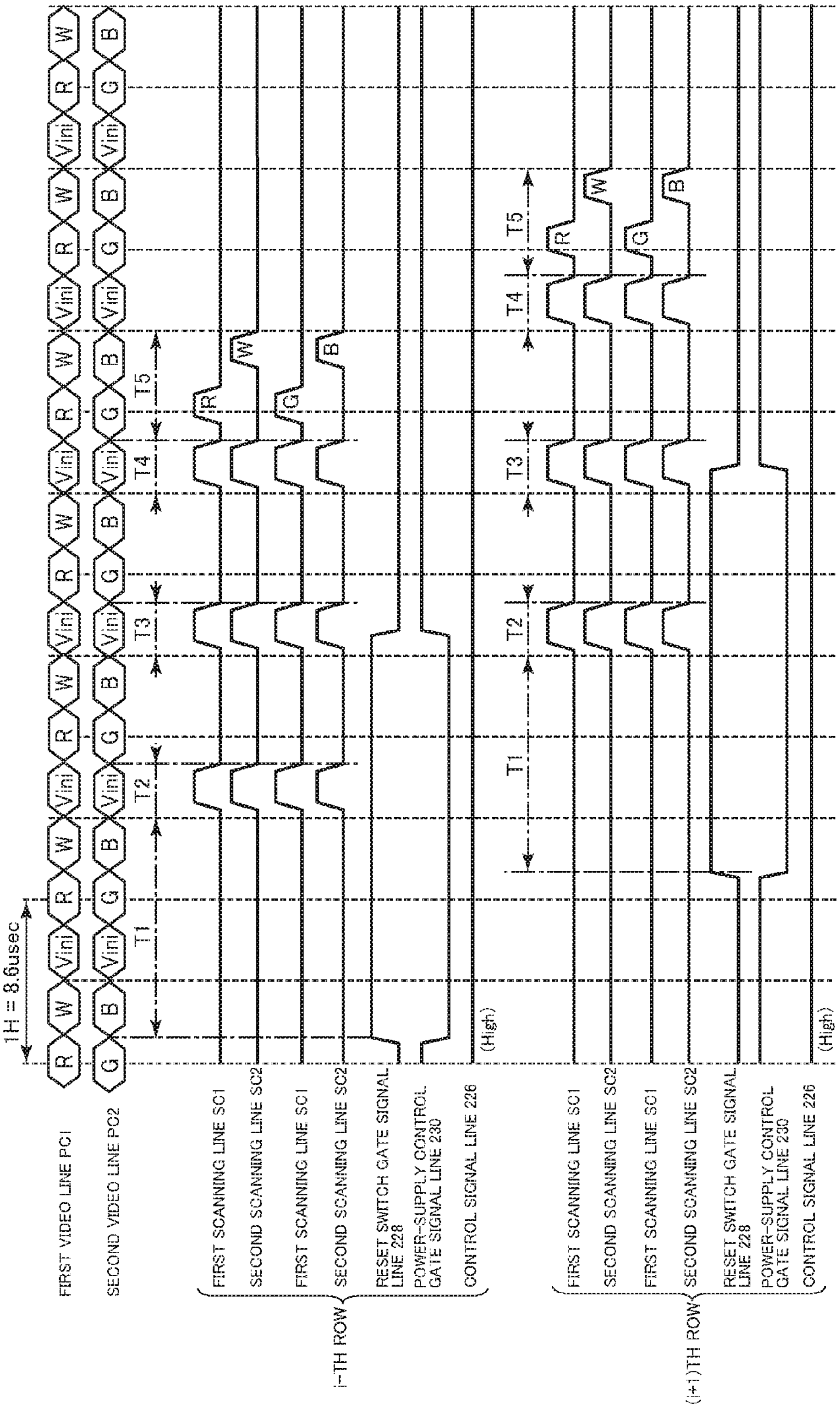
FIG. 4 is a timing chart showing an example of a light emitting operation in the pixel circuit of FIG. 3.

FIG. 4 is a timing chart showing an example of a light emitting operation in the circuit of the pixel 200 of FIG. 3. As shown in this timing chart, an initialization voltage Vini, a video signal voltage Vsig corresponding to the gradation value of R, and a video signal voltage Vsig corresponding to the gradation value of W are applied to the first video line PC1 in order, and an initialization voltage Vini, a video signal voltage Vsig corresponding to the gradation value of G, and a video signal voltage Vsig corresponding to the gradation value of B are applied to the second video line PC2 in order. This is carried out for each of the first to M-th columns of pixels 200. Hereinafter, the application of a video signal voltage in the pixels 200 in the i-th row will be described. In FIG. 4, the video signal voltage Vsig corresponding to the gradation value of R is expressed as R, the video signal voltage Vsig corresponding to the gradation value of W is expressed as W, the video signal voltage Vsig corresponding to the gradation value of G is expressed as G, and the video signal voltage Vsig corresponding to the gradation value of B is expressed as B. This also applies to FIGS. 6, 7, 10, 11, 14, 16 and 19, described later.

First, in a source reset period T1, with the control signal line 226 maintained at high potential to keep the electrical continuity of the control transistor 216, the reset transistor gate signal line 228 is set to high and the power-supply control gate signal line 230 is set to low. Thus, the power supply control transistor 220 becomes electrically discontinuous and the reset transistor 218 becomes electrically continuous. Therefore, the source and drain of the drive transistor 212 have the reset voltage Vrst.

Next, in a gate reset period T2 when the initialization voltage Vini is applied to the first video line PC1 and the second video line PC2, with the states of the reset transistor 218 and the power supply control transistor 220 maintained, the first scanning line SC1 and the second scanning line SC2 are set to high to apply the initialization voltage Vini to the gate of the drive transistor 212, and subsequently the first scanning line SC1 and the second scanning line SC2 are set to low before the voltage applied to the first video line PC1 and the second video line PC2 changes to the video signal voltage Vsig. Thus, the video signal voltage Vsig corresponding to the gradation value applied in the previous frame is initialized. Here, the initialization voltage Vini can be approximately 2 V.

Moreover, in offset cancellation periods T3 and T4 when the initialization voltage Vini is applied to the first video line PC1 and the second video line PC2 after the gate reset period T2, the reset transistor gate signal line 228 is set to low and the power-supply control gate signal line 230 is set to high. Thus, the reset transistor 218 becomes electrically discontinuous and the power supply control transistor 220 becomes electrically continuous, and therefore the positive power-supply voltage Vdd is applied to the drain of the drive transistor 212. Meanwhile, the first scanning line SC1 and the second scanning line SC2 are set to high to apply the initialization voltage Vini to the gate of the drive transistor 212, and subsequently the first scanning line SC1 and the second scanning line SC2 are set to low before the voltage applied to the first video line PC1 and the second video line PC2 changes to the video signal voltage Vsig. Thus, the potential at the source of the drive transistor 212 takes the reset voltage Vrst written in the source reset period T1 as its initial value and then shifts toward higher potential while decreasing by the amount of current flowing in through the drain and source of the drive transistor 212 and also absorbing and compensating for variance in TFT characteristics of the drive transistor 212. The offset cancellation is carried out twice, once each in the offset cancellation periods T3 and T4. At the end of the offset cancellation period T4, the source potential of the drive transistor 212 is approximately equal to the initialization voltage (Vini−Vth). Here, Vth is a threshold voltage of the drive transistor 212. Thus, the gate-source voltage of the drive transistor 212 reaches a cancellation point where the difference in the threshold Vth of each drive transistor 212 is cancelled, and the potential difference equivalent to this cancellation point is stored in the storage capacitor Cs. The principle of the offset cancellation will be described later. The offset cancellation period can be provided once or a plurality of times according to need. Also, the total of the offset cancellation periods T3 and T4 can be set, for example, to approximately 1 μsec.

Next, in a writing period T5, first, the video signal voltage Vsig corresponding to the gradation value of the R subpixel 202 of the pixel 200 is applied to the first video line PC1, and the video signal voltage Vsig corresponding to the gradation value of the G subpixel 204 is applied to the second video line PC2. At this timing, the first scanning line SC1 and the second scanning line SC2 are set to high to apply the video signal voltages Vsig corresponding to the R subpixel 202 and the G subpixel 204 to the gates of the drive transistors 212 of the R subpixel 202 and the G subpixel 204, respectively. Subsequently, the first scanning line SC1 and the second scanning line SC2 are set to low. At the next timing, the video signal voltage Vsig corresponding to the gradation value of the W subpixel 206 of the pixel 200 is applied to the first video line PC1, and the video signal voltage Vsig corresponding to the gradation value of the B subpixel 208 is applied to the second video line PC2. At this timing, the first scanning line SC1 and the second scanning line SC2 are set to high to apply the video signal voltages Vsig corresponding to the W subpixel 206 and the B subpixel 208 to the gates of the drive transistors 212 of the W subpixel 206 and the B subpixel 208, respectively. Subsequently, the first scanning line SC1 and the second scanning line SC2 are set to low. By this operation, the potential corresponding to the gradation value is held in the storage capacitor Cs of each subpixel of the pixel 200.

In each of the periods T1 to T5, the control signal line 226 is fixed to high. Therefore, particularly in the writing period T5, since the positive power-supply voltage Vdd is applied to the drain of the drive transistor 212, the correction of mobility μ in order to absorb the difference in the mobility μ of the drive transistor 212 in each subpixel is carried out. This feature will be described in detail below, along with the offset cancellation.

Figure 5A:
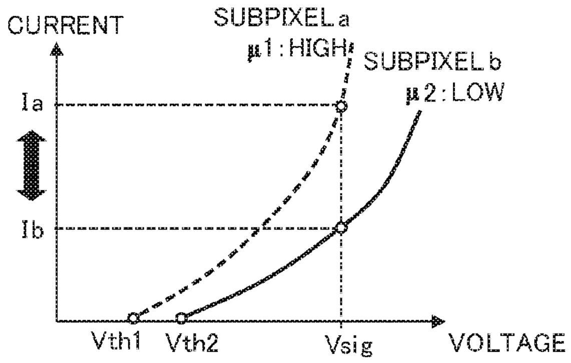
FIG. 5A is a graph showing V-I curves of two drive transistors with different characteristics.

FIG. 5A is a graph showing V-I curves of two drive transistors 212 with different characteristics. As shown in FIG. 5A, in this case, the threshold value Vth1 of the drive transistor 212 with the subpixel a is lower than the threshold value Vth2 of the drive transistor 212 with the subpixel b, and the mobility μ1 of the drive transistor 212 with the subpixel a is higher than the mobility μ2 of the drive transistor 212 with the subpixel b. Here, the mobility is an indicator indicating how mobile a carrier generated by the difference in the amount of impurities introduced in doping at the time of forming the transistor is. As shown in this graph, if the current flowing between the source and drain when Vsig is applied to the gate of the drive transistor 212 in the case of the subpixel a and that in the case of the subpixel b are compared, it can be seen that the current Ia in the case of the subpixel a is significantly higher than the current Ib in the case of the subpixel b, resulting in a large difference in the current.

Figure 5B:
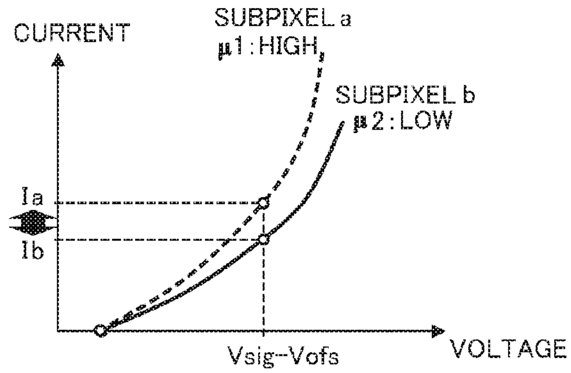
FIG. 5B is a graph showing V-I curves in the case where offset cancellation is carried out to each of the drive transistors with subpixels a and b of FIG. 5A.

FIG. 5B is a graph showing V-I curves in the case where offset cancellation is carried out to each of the drive transistor 212 with the subpixel a and the drive transistor 212 with the subpixel b of FIG. 5A. By the offset cancellation operation, the potential corresponding to each drive transistor 212 is held in advance at the gate of each drive transistor 212, and the gate-source potential becomes equal to an offset potential Vofs (=Vini−Vth). Therefore, it appears that the threshold voltages Vth are the same. Thus, even if the video signal voltage Vsig is applied, the difference between the currents Ia and Ib can be reduced.

Figure 5C:
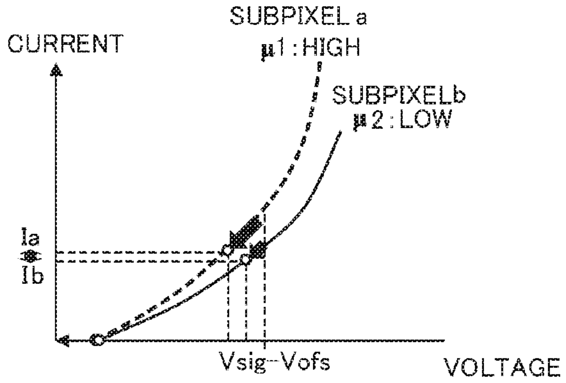
FIG. 5C is a graph showing V-I curves in the case where correction of mobility is carried out to each of the drive transistors with subpixels a and b after the offset cancellation shown in FIG. 5B is carried out.

FIG. 5C is a graph showing V-I curves in the case where mobility correction is carried out to each of the drive transistor 212 with the subpixel a and the drive transistor 212 with the subpixel b, after the offset cancellation is carried out in the example shown in FIG. 5B. With the positive power-supply voltage Vdd kept applied to the drain of the drive transistor 212, the video signal voltage Vsig is applied. Thus, the currents Ia and Ib decrease according to the shape of the I-V curve unique to each drive transistor 212. The gate-source potential of the drive transistor 212 is (Vini−Vth+Cs×(Vsig−Vini)/(Cs+Cel+Cad)) at the start of the writing and (Vini−Vth+ΔV+Cs×(Vsig−Vini)/(Cs+Cel+Cad)) at the end of the writing. ΔV is the correction of the mobility and this enables compensation for the difference due to the mobility of each drive transistor 212 and further reduction in the difference between the currents Ia and Ib.

In the correction based on the offset cancellation, since the source potential can be brought closer to (Vini−Vth) by taking time, correction can be made even when time control is difficult. However, the correction of the mobility is based on time control and therefore there is a risk of an increase in the difference if the correction time is too long. Also, in a particularly high-definition display device, it is desirable that the scanning lines SC are thinly formed in order to increase the aperture ratio in view of light emission efficiency. However, if the scanning lines SC are thinly formed, the response of the scanning lines SC to signal application becomes slower. Therefore, it is difficult to control the very short time for mobility correction to be uniform across the subpixels in the displays area 120.

Figure 6:
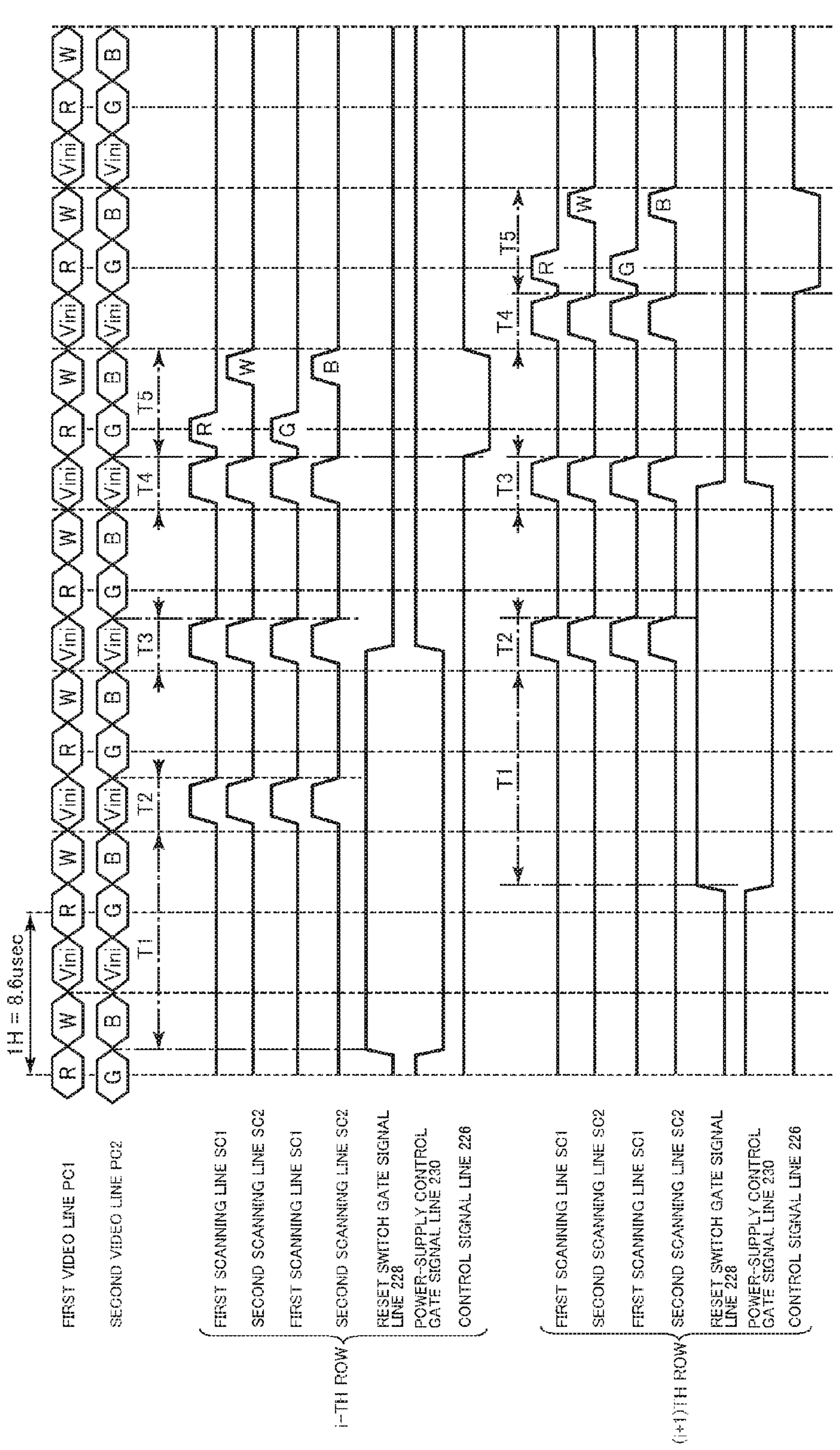
FIG. 6 is a timing chart showing an example of a light emitting operation in the pixel circuit of FIG. 3.

FIG. 6 is a timing chart showing an example of a light emitting operation in the circuit of the pixel 200 of FIG. 3. The timing chart of FIG. 6 is different from the timing chart of FIG. 4 in that the control signal line 226 is set to low in the writing period T5, but is similar to the timing chart of FIG. 4 in other respects. As the control signal line 226 is thus set to low in the writing period T5, the control transistor 216 is made electrically discontinuous and the drain of the drive transistor 212 is set in a high-impedance state.

In the case where mobility correction is carried out when the video signal voltage Vsig is applied, it is required that the video signal voltage Vsig should be written within a shorter time. However, as shown in FIG. 6, by setting the drain of the drive transistor 212 in a high-impedance state and performing control without mobility correction, the requirement of time control of the pixel transistor 214 can be relaxed. Therefore, the width of the first scanning line SC1 and the second scanning line SC2 can be made thinner and the aperture ratio can be improved further. This enables higher definition as well. Also, since the resistance of the scanning line drive circuit 132 no longer needs to be reduced, it leads to a further reduction in the scale of the scanning line drive circuit and the frame area formed around the display area 120 can be reduced further. Moreover, in the display area 120 with higher definition, the distance between transistors is short and it is considered that there is little difference in mobility between the respective transistors. Therefore, high display quality can be maintained without carrying out mobility correction in the first place. Also, as the drain of the drive transistor 212 is set in a high-impedance state, there is no current leakage at the time of the writing and the accurate video signal voltage Vsig can be written within a shorter time. Moreover, since a longer writing time for the video signal voltage Vsig can be taken than in the case where mobility correction is carried out, the amplitude of the applied video signal voltage Vsig can be restrained as well and this leads to a reduction in power consumption. Thus, an organic EL display device with a narrower frame and higher light emission efficiency can be provided even when high definition is achieved.

Figure 7:
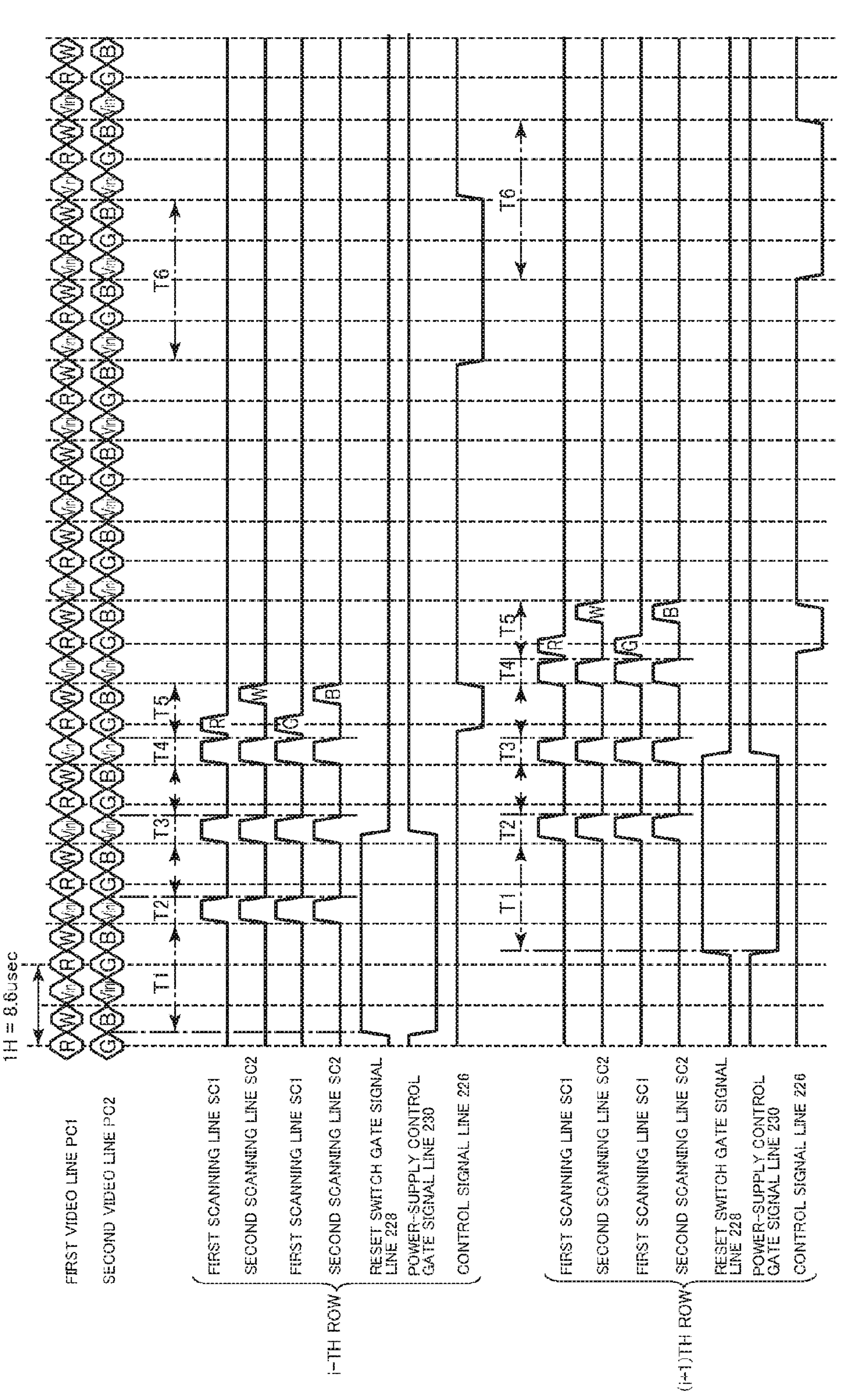
FIG. 7 is a timing chart in the case where black insertion is carried out during a display period, in addition to the control without mobility correction carried out in the timing chart of FIG. 6.

FIG. 7 is a timing chart showing the case where black insertion is carried out during the display period, in addition to the control without mobility correction carried out in the timing chart of FIG. 6. The timing chart of FIG. 7 is different from the timing chart of FIG. 6 in that a black insertion period T6 is provided during the display period after the end of the writing period T5, and is similar to the timing chart of FIG. 6 in other respects. In the black insertion period T6, the control signal line 226 is set to low, thus making the control transistor 216 electrically discontinuous and setting the drain of the drive transistor 212 in a high-impedance state. Thus, since the current supplied to the light emitting element 210 from the positive power-supply voltage Vdd is stopped, the light emission in the pixel 200 is stopped. That is, control in which the color of black is inserted for a very short time during the display period is performed. By thus inserting the color of black, the sense of afterimage of the display image experienced by the observer can be restrained and therefore quality can be improved particularly when displaying a dynamic image. In this embodiment, a black insertion period equivalent to two horizontal synchronization periods (2H) per frame is provided. However, a period equivalent to 1H, or 3H or longer may be used. The settings on whether to provide the black insertion period T6 or not, its duration, and whether to carry out mobility correction during the writing period T5 or not, may be carried out by a register within the IC (integrated circuit) arranged on the TFT substrate. It is preferable that the register is thus made to carry out the settings, enabling proper driving according to the characteristics of the panel. This also applies to modifications and a second embodiment described below.

Figure 8:
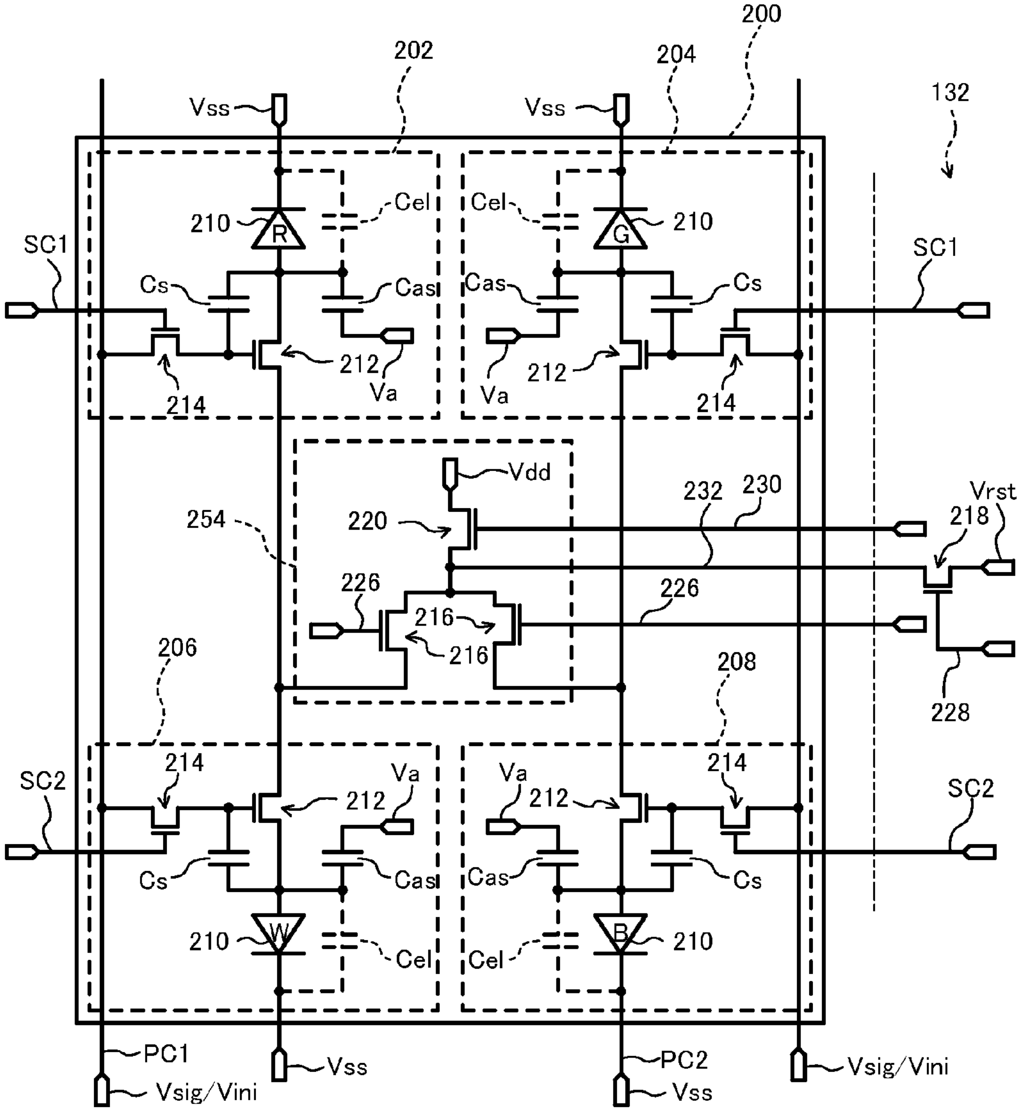
FIG. 8 is a circuit diagram showing a modification of the pixel circuit shown in FIG. 3.

FIG. 8 is a circuit diagram showing a modification of the circuit of the pixel 200 shown in FIG. 3. The circuit of FIG. 8 is different from the circuit of FIG. 3 in the circuit configuration of an output control circuit 254, and is similar to the circuit of FIG. 3 in other respects. The output control circuit 252 of FIG. 3 has only one control transistor 216 per pixel 200 and controls four subpixels, whereas the output control circuit 254 of FIG. 8 has two control transistors 216, that is, a control transistor 216 which controls the R subpixel 202 and the W subpixel 206, and a control transistor 216 which controls the G subpixel 204 and the B subpixel 208. By thus having two control transistors 216, it may be possible to reduce the capacitance of each control transistor 216. Also, by securing two smaller arrangement areas, it may be possible to reduce the overall area. Moreover, by using a plurality of transistors separately, the influence of malfunction of the transistors, if any, can be minimized.

Although providing two control transistors 216 per pixel 200 is described above, it is also possible to provide two power supply control transistors 220, or use a combination of arbitrary numbers of power supply control transistors 220 and control transistors 216. For example, the combination denoted by (the number of power supply control transistors 220, the number of control transistors 216) in the pixel 200 may be (2, 1), (1, 4), (4, 1), (2, 2), (4, 4) or the like. These combinations can be determined in consideration of the area of the circuit occupying the pixel 200, or the like.

Figure 9:
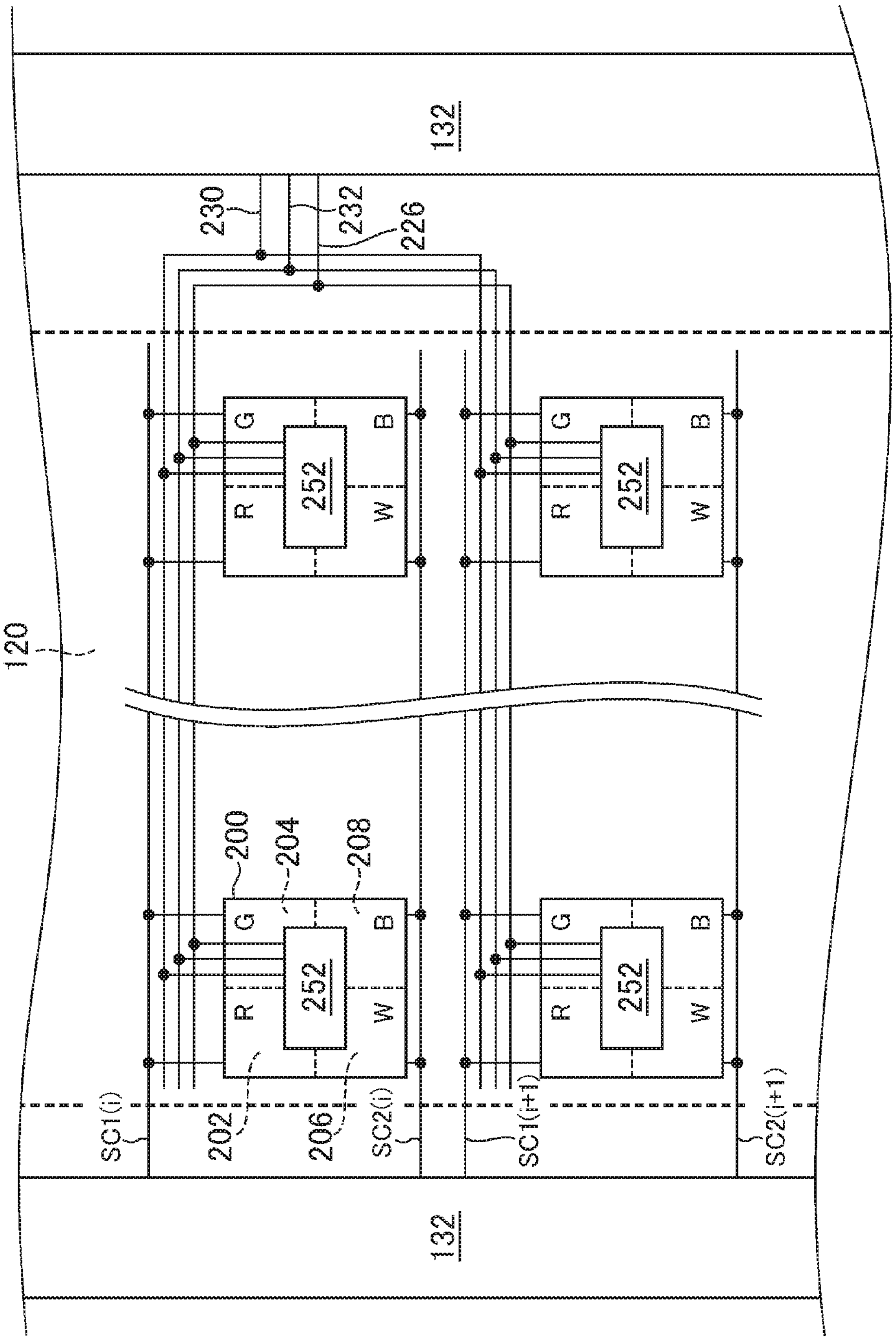
FIG. 9 is a schematic circuit diagram showing the case where a scanning line drive circuit outputs the same signal to each set of control signal line, reset signal line and a power-supply control gate signal line, provided in two pixel rows.

FIG. 9 is a schematic circuit diagram showing the case where the scanning line drive circuit 132 outputs the same signal to each of the control signal lines 226, the reset signal lines 232 and power-supply control gate signal lines 230 corresponding to two rows that are next to each other. The scanning line drive circuit 132 may output the signal to the control signal line 226, the reset signal line 232 and the power-supply control gate signal line 230 corresponding to one row, but may be output the signal to two rows at a time, or three or more rows at a time. By thus outputting the signal to a plurality of rows at a time, the scanning line drive circuit 132 can be decreased and the frame area can be decreased. While the two control signal lines 226 and the like that are next to each other are described as connected to each other in FIG. 9, the signal lines need be not connected to each other and the same signal may be applied to each of the signal lines.

Figure 10:
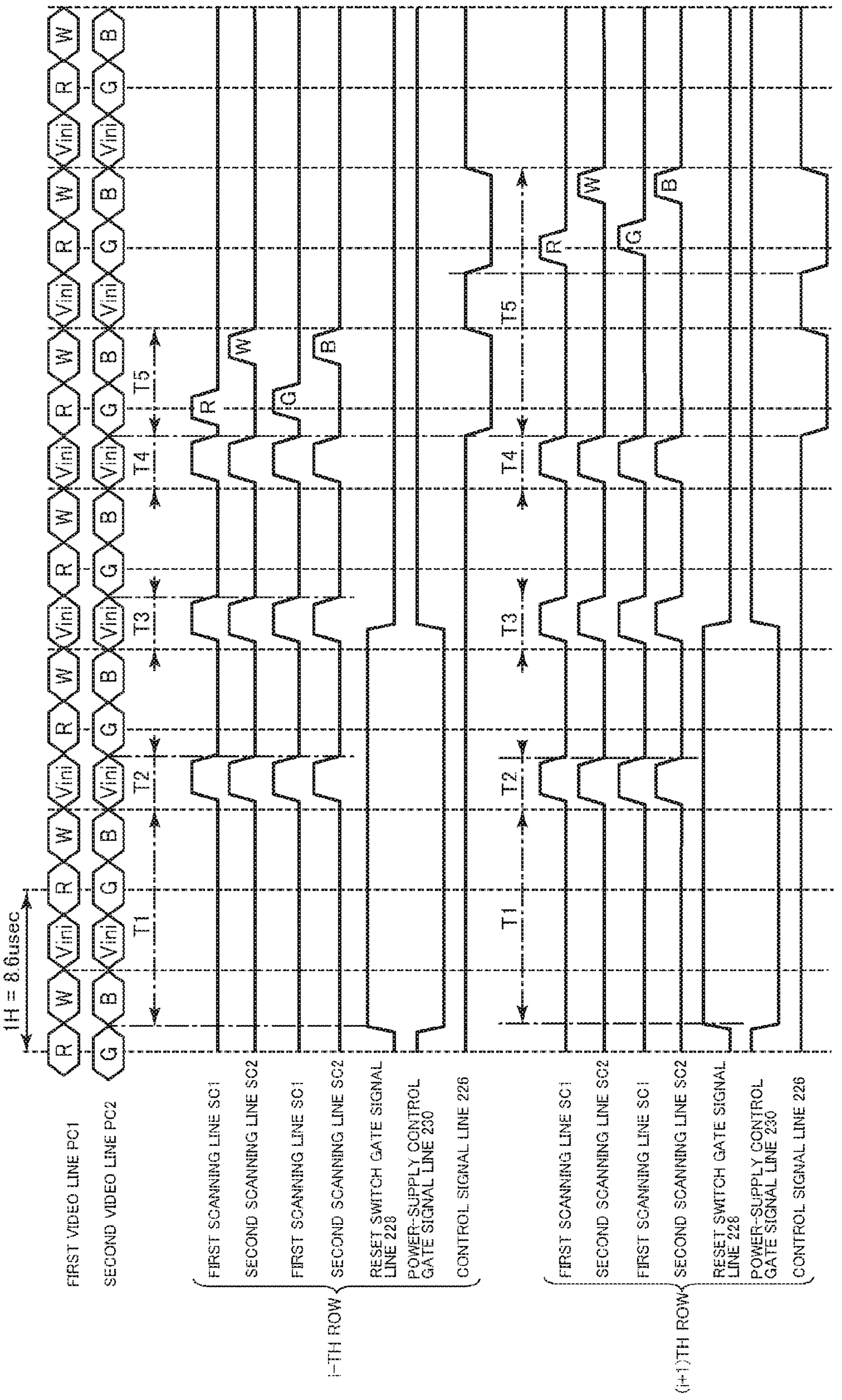
FIG. 10 is a timing chart showing the case where outputs are made to two rows of control signal lines, reset signal lines and power-supply control gate signal lines at a time, as shown in FIG. 9, and where mobility correction is not carried out, as shown in FIG. 6.

FIG. 10 is a timing chart showing the case where a common signal is outputted to the control signal lines 226, the reset signal lines 232 and the power-supply control gate signal lines 230 corresponding to two pixel rows, as shown in FIG. 9, and where mobility correction is not carried out, as shown in FIG. 6. As shown in this timing chart, other than in the writing period T5 of the row to which the video signal voltage Vsig is written, the signal applied to the control signal line 226 is at low in the writing period T5 of the neighboring row.

Figure 11:
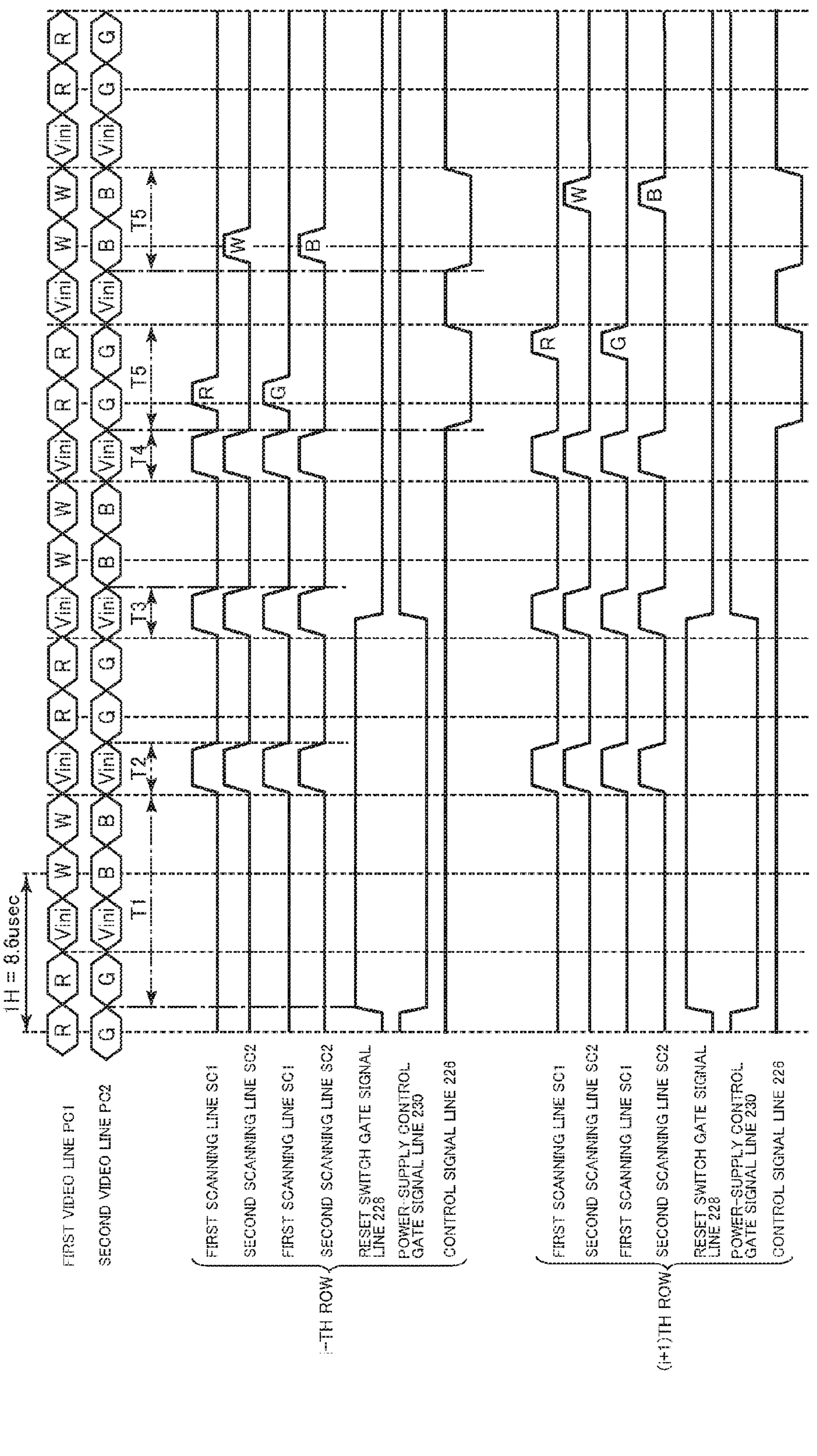
FIG. 11 is a timing chart showing an example that is different from the timing chart of FIG. 10, in the case where the circuit diagram of FIG. 9 is used.

FIG. 11 is a timing chart showing an example that is different from the timing chart of FIG. 10, in the case where the circuit diagram of FIG. 9 is used. In the timing chart of FIG. 10, at the first timing, the video signal voltage Vsig is written with respect to the subpixels relating to the first scanning line SC1, that is, the R subpixel 202 and the G subpixel 204, and at the next timing, the video signal voltage Vsig is written with respect to the subpixels relating to the second scanning line SC2, that is, the W subpixel 206 and the B subpixel 208. However, in the timing chart of FIG. 11, though the writing of the video signal voltage Vsig at the first timing in the writing period T5 with respect to the subpixels relating to the first scanning line SC1, that is, the R subpixel 202 and the G subpixel 204, in the i-th row is the same as in FIG. 10, at the next timing, the video signal voltage Vsig is written to the R subpixel 202 and the G subpixel 204 relating to the first scanning line SC1 in the (i+1)th row, and then back to the i-th row, the video signal voltage Vsig is written to the W subpixel 206 and the B subpixel 208 relating to the second scanning line SC2, and then to the W subpixel 206 and the B subpixel 208 relating to the scanning line SC2 in the (i+1)th row. That is, the video signal voltage is written continuously to the subpixels of the same color in the same column of the i-th row and the (i+1)th row. In the circuit diagram of FIG. 9, the operation at such timings can be carried out.

Second Embodiment

Figure 12:
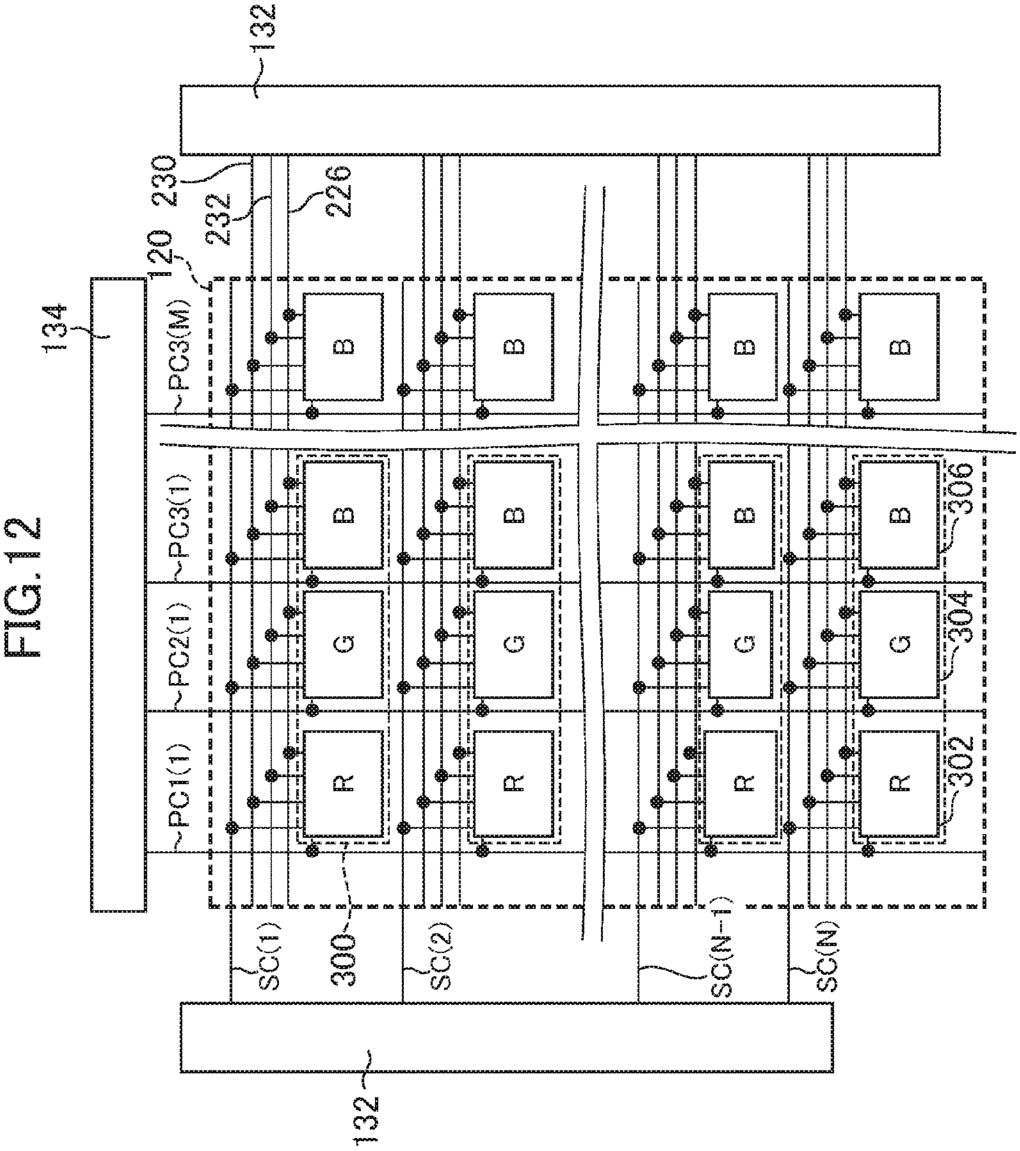
FIG. 12 schematically shows a circuit formed on a TFT substrate according to a second embodiment of the invention.

FIG. 12 schematically shows a circuit formed on a TFT substrate according to a second embodiment of the invention. As shown in FIG. 12, a pixel 300 according to the second embodiment has a three-subpixel structure in which an R subpixel 302, a G subpixel 304 and a B subpixel 306 are arranged along a scanning line SC. To each subpixel, the power-supply control gate signal line 230, the reset signal line 232 and the control signal line 226 extend from the scanning line drive circuit 132 on the right side, and scanning lines SC(1) to SC(N) extend from the scanning line drive circuit 132 on the left side. From the video line drive circuit 134, first video lines PC1(1) to PC1(M) extend to the R subpixel 302, second video lines PC2(1) to PC2(M) extend to the G subpixel 304, and third video lines PC3(1) to PC3(M) extend to the B subpixel 306. In this embodiment, too, the scanning line drive circuit 132 and the video line drive circuit 134 may be an IC arranged on the TFT substrate, or a circuit directly formed on the substrate. The scanning line drive circuit 132 may be arranged to both the left and right of the display area 120 or may be arranged on one side only. If the scanning line drive circuit 132 is arranged on both sides, any signal line may extend from either side.

Figure 13:
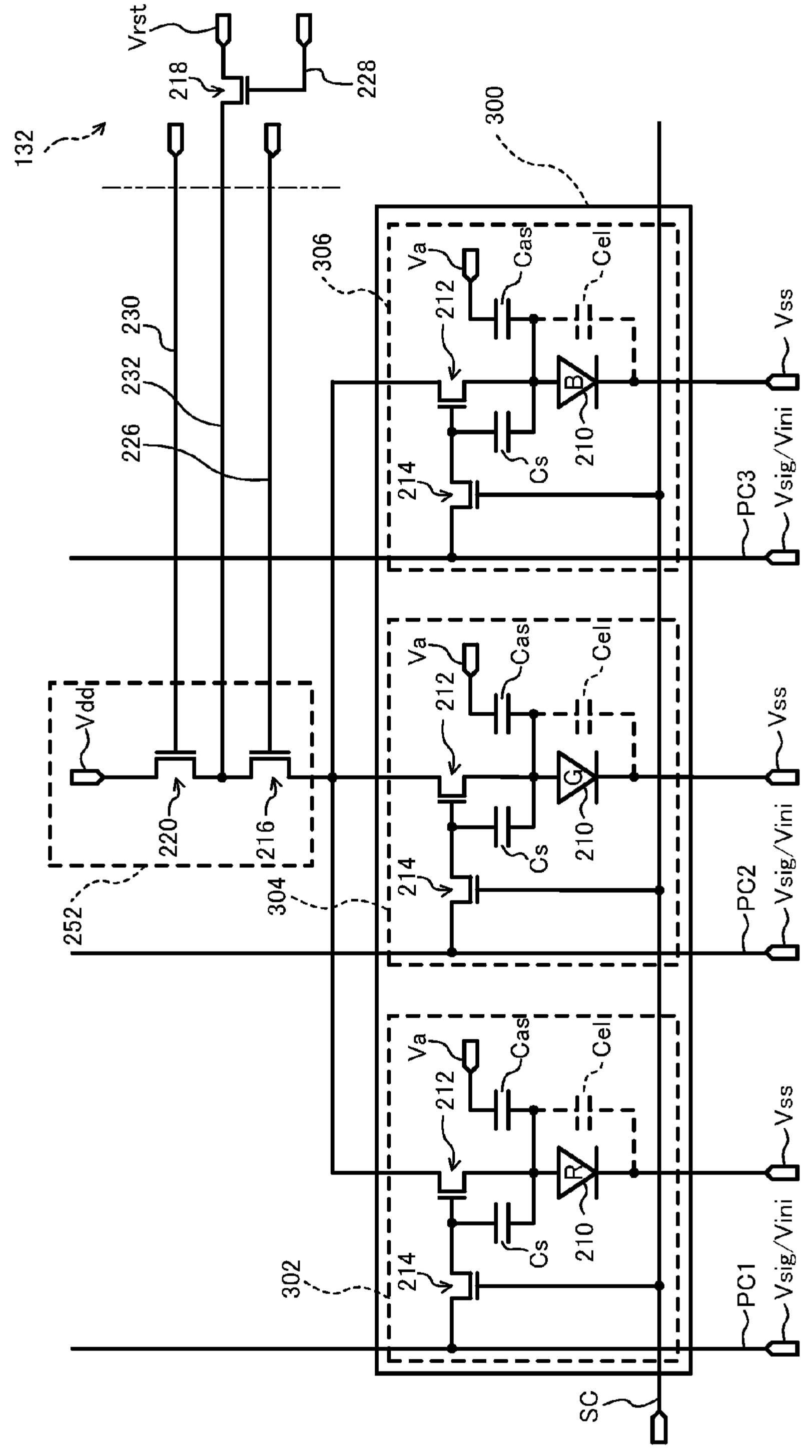
FIG. 13 is a circuit diagram showing details of a circuit which controls pixels of FIG. 12.

FIG. 13 is a circuit diagram showing details of a circuit which controls the pixel 300. As described above, the pixel 300 has the three-subpixel structure in which an R subpixel 302, a G subpixel 304 and a B subpixel 306 are arranged along one scanning line SC. The configuration of each subpixel is the same circuit configuration except the light emission color of the light emitting element 210 and is similar to each subpixel in the pixel 200 of the first embodiment, and therefore will not be described further in detail. The circuit configuration of the subpixels is only an example and any circuit that can control the light emission of the light emitting element 210 can be used. As shown in FIG. 13, the drain of the drive transistor 212 of each of the subpixels 302, 304 and 306 in the pixel 300 is connected to the output end of the output control circuit 252, which is the only one in the pixel 300. The configuration of the output control circuit 252 and the configuration of the reset transistor 218 formed in the scanning line drive circuit 132 are similar to those shown in FIG. 3 and therefore will not be described further in detail.

Figure 14:
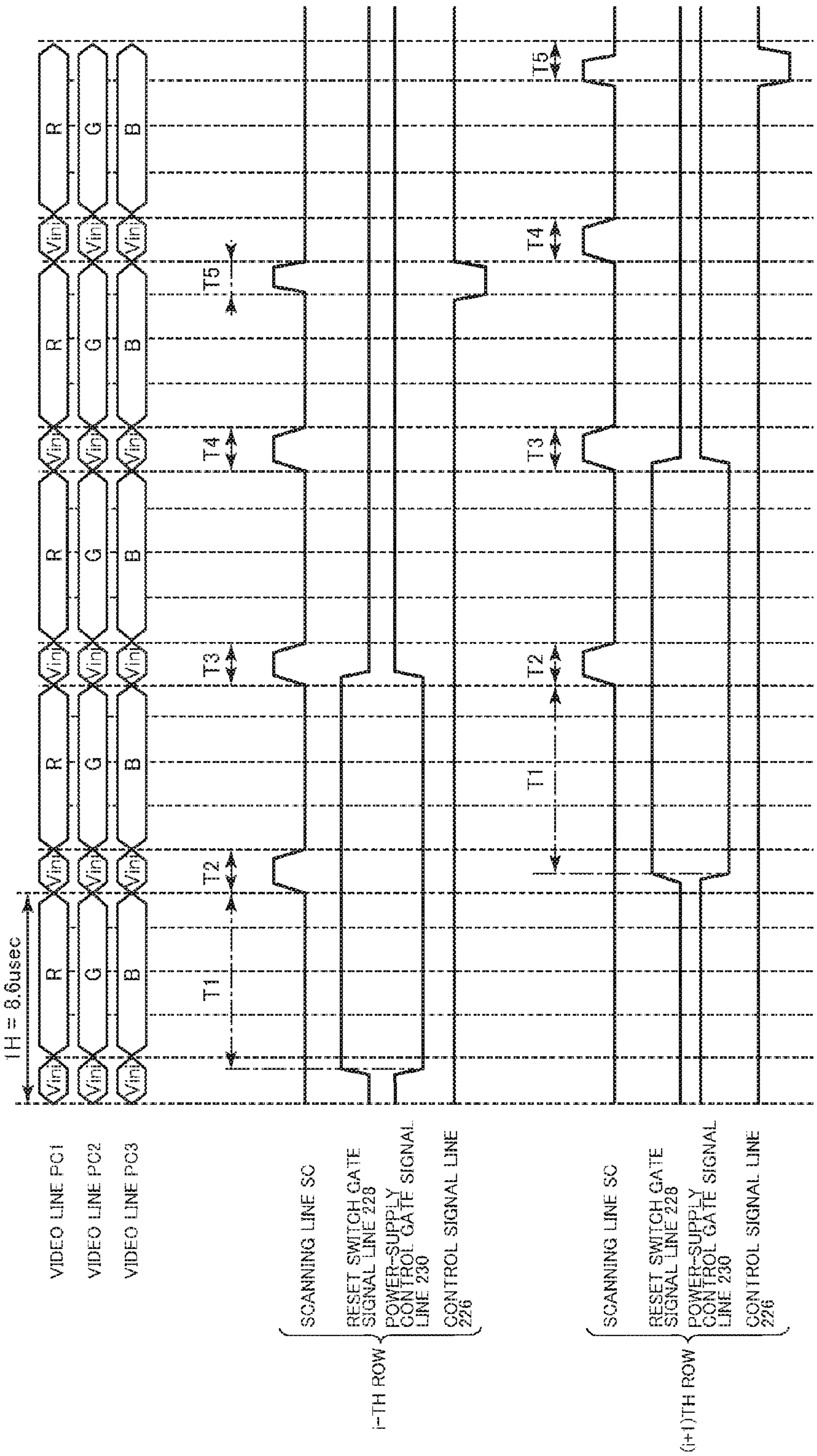
FIG. 14 is a timing chart showing an example of a drive timing in the circuit shown in FIG. 13.

FIG. 14 is a timing chart showing an example of a drive timing in the circuit shown in FIG. 13. In FIG. 14, since the three subpixels of RGB are arranged along the scanning line SC as shown in FIG. 13, writing is simultaneously carried out to the three subpixels. It is shown that a low signal is applied to the control signal line 226 in the writing period T5 and that mobility correction is not carried out. However, in the writing period T5, mobility correction may be carried out with the control signal line 226 maintained at high, or the black insertion period T6 may be provided as shown in FIG. 7. Even with the configurations and operations shown in FIGS. 12 to 14, an organic EL display device with a narrower frame and higher light emission efficiency can be provided even when high definition is achieved, as in the first embodiment. The purpose of arranging the writing period T5 in the video signal voltage Vsig output period near the end of the horizontal period 1H is to stabilize each video line and write the video signal voltage Vsig of high quality.

Figure 15:
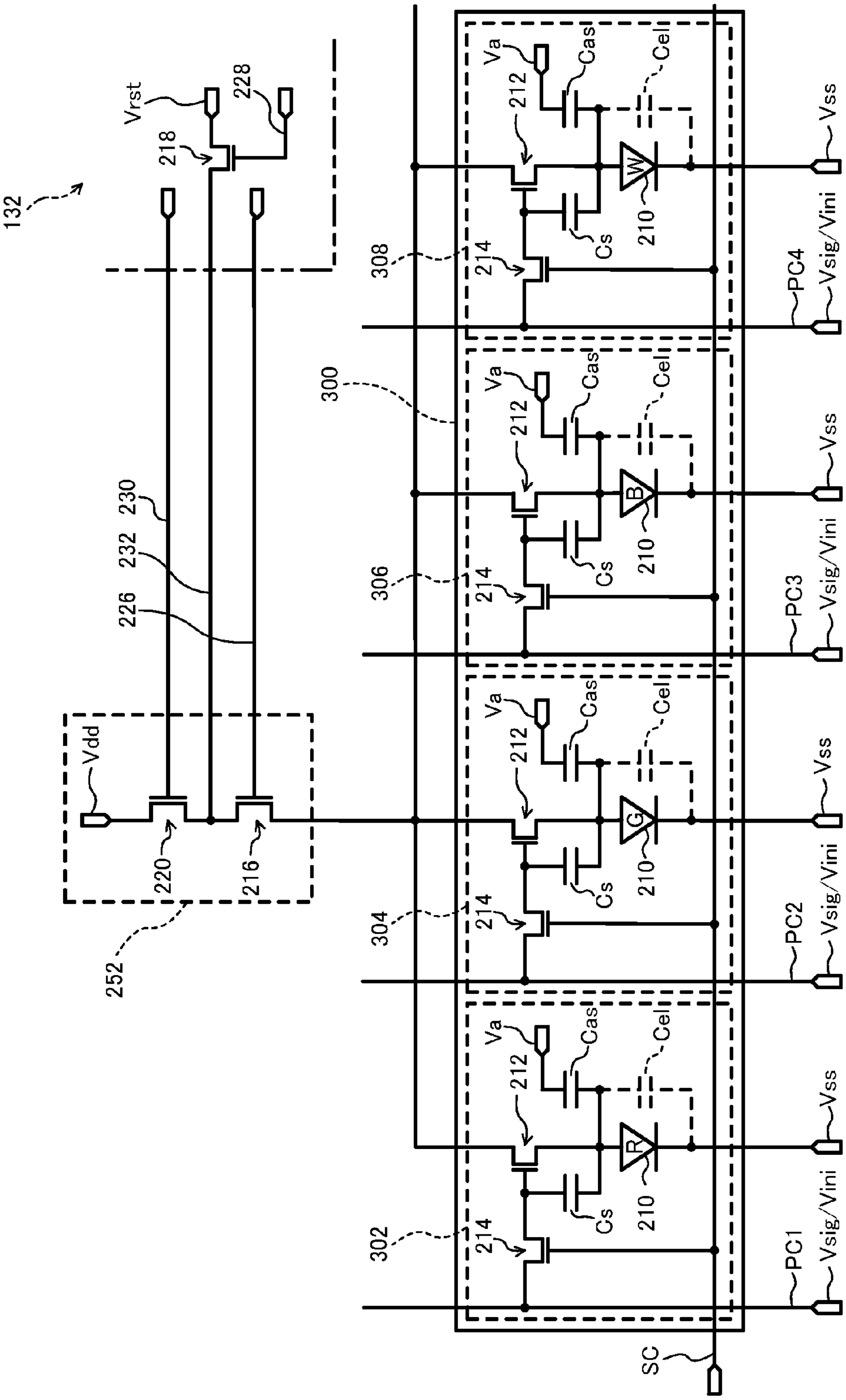
FIG. 15 shows a circuit which controls a pixel made up of subpixels with the four colors of RGBW arrayed along a scanning line SC.
Figure 16:
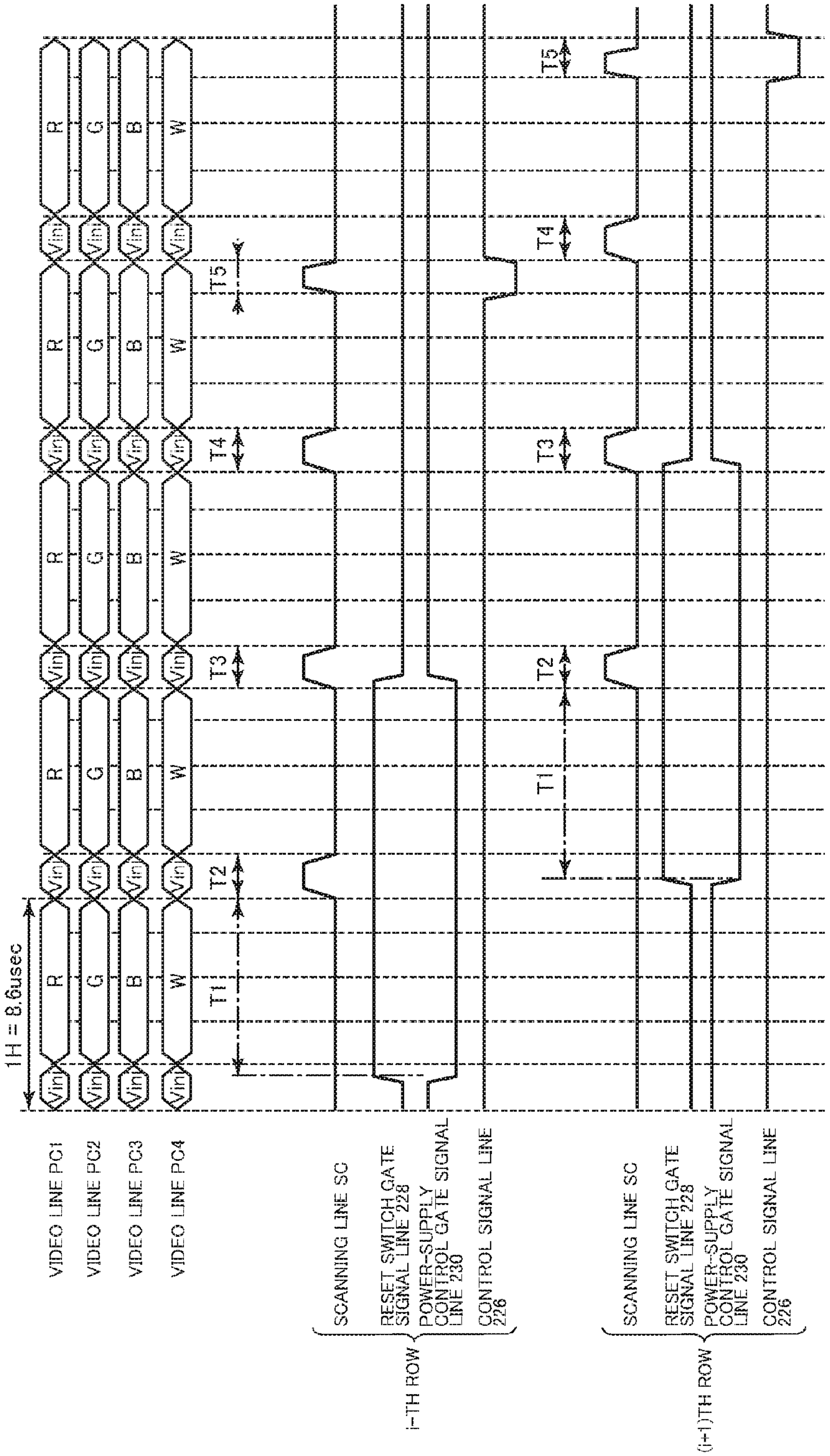
FIG. 16 is a timing chart showing an example of a drive timing in the case where mobility correction is not carried out, in the circuit shown in FIG. 15.

FIG. 15 is a circuit diagram showing the case where subpixels of the four colors of RGBW are used as the subpixels arranged along the scanning line SC in the pixel 300 of FIG. 13. FIG. 16 is a timing chart showing an example of a drive timing in the case where mobility correction is not carried out, in the circuit shown in FIG. 15. The circuit diagram of FIG. 15 is different from the circuit diagram of FIG. 13 in that a W subpixel 308 is arranged next to the B subpixel 306 along the scanning line SC. The timing chart of FIG. 16 is different from the timing chart of FIG. 14 in that a video line PC4 which applies a video signal to the W subpixel 308 is added. Also, fourth video lines PC4(1) to PC4(M) extend to the W subpixel 308 from the video line drive circuit 134. Thus, writing is carried out simultaneously to the four subpixels. Also in this timing chart, it is shown that a low signal is applied to the control signal line 226 in the writing period T5 and that mobility correction is not carried out. However, in the writing period T5, mobility correction may be carried out with the control signal line 226 maintained at high, or the black insertion period T6 may be provided as shown in FIG. 7. Even with the configurations shown in FIGS. 15 and 16, an organic EL display device with a narrower frame and higher light emission efficiency can be provided even when high definition is achieved, as in the first embodiment.

Figure 17:
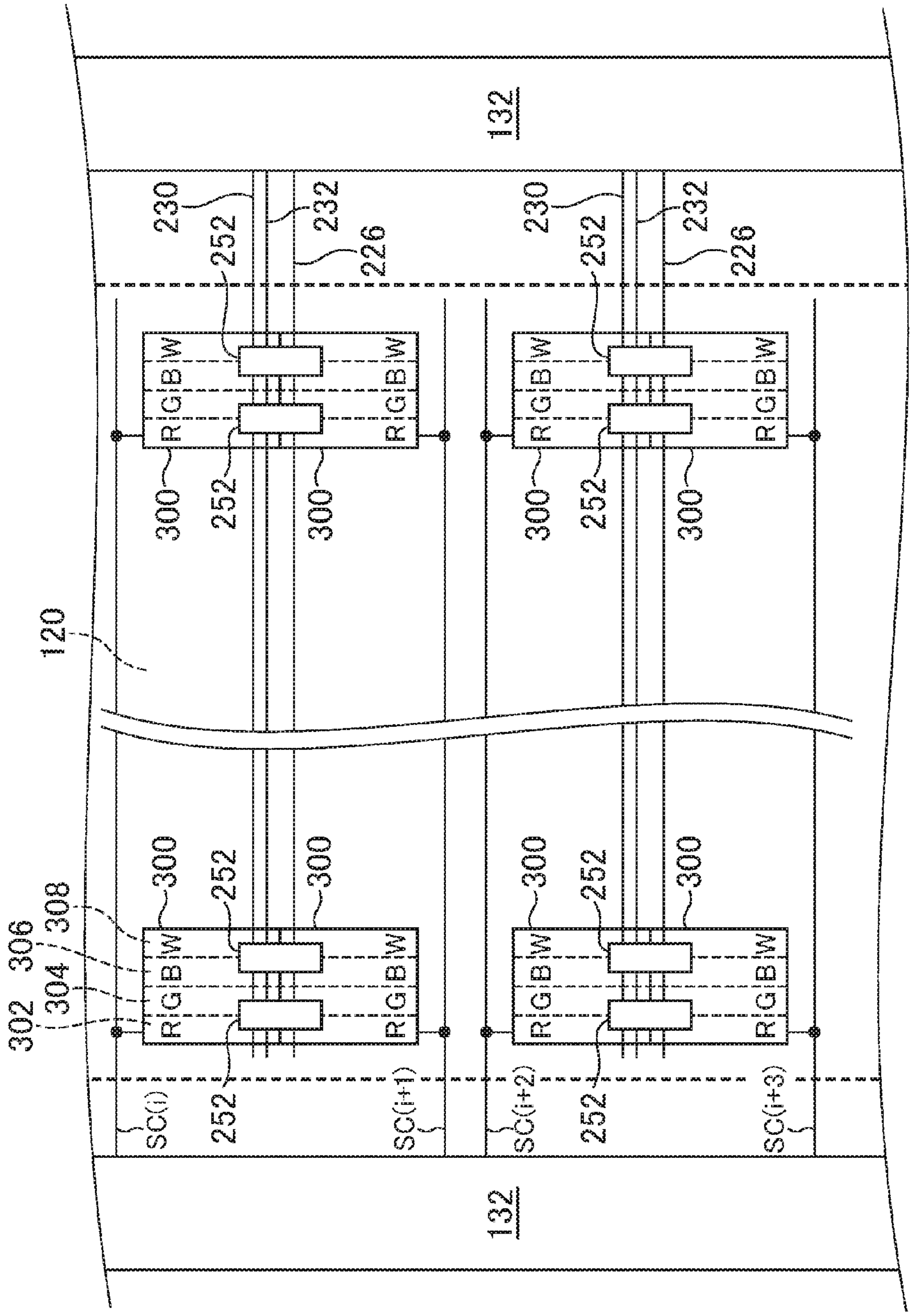
FIG. 17 is a block diagram showing a first modification of the arrangement of an output control circuit in the case where subpixels with the four colors of RGBW are arrayed along a scanning line SC as shown in FIG. 15.

FIG. 17 is a block diagram showing a first modification of the arrangement of the output control circuit 252 in the case where the subpixels forming each pixel are made up of subpixels of the four colors of RGBW arranged along the scanning line SC as shown in FIG. 15. As shown in FIG. 17, in this modification, one output control circuit 252 is provided for subpixels of two colors in two rows, for example, the R subpixel 302 and the G subpixel 304 in the i-th row and the R subpixel 302 and the G subpixel 304 in the (i+1)th row, and the same output control circuit 252 is shared among a total of four subpixels. By thus sharing the output control circuit 252 among subpixels in two rows, the number of output control circuits 252 can be reduced and the circuit scale can be reduced. At the same time, the output control circuit 252 can be arranged at a position closer to the circuit of each subpixel, thus enabling a more efficient circuit arrangement.

Figure 18:
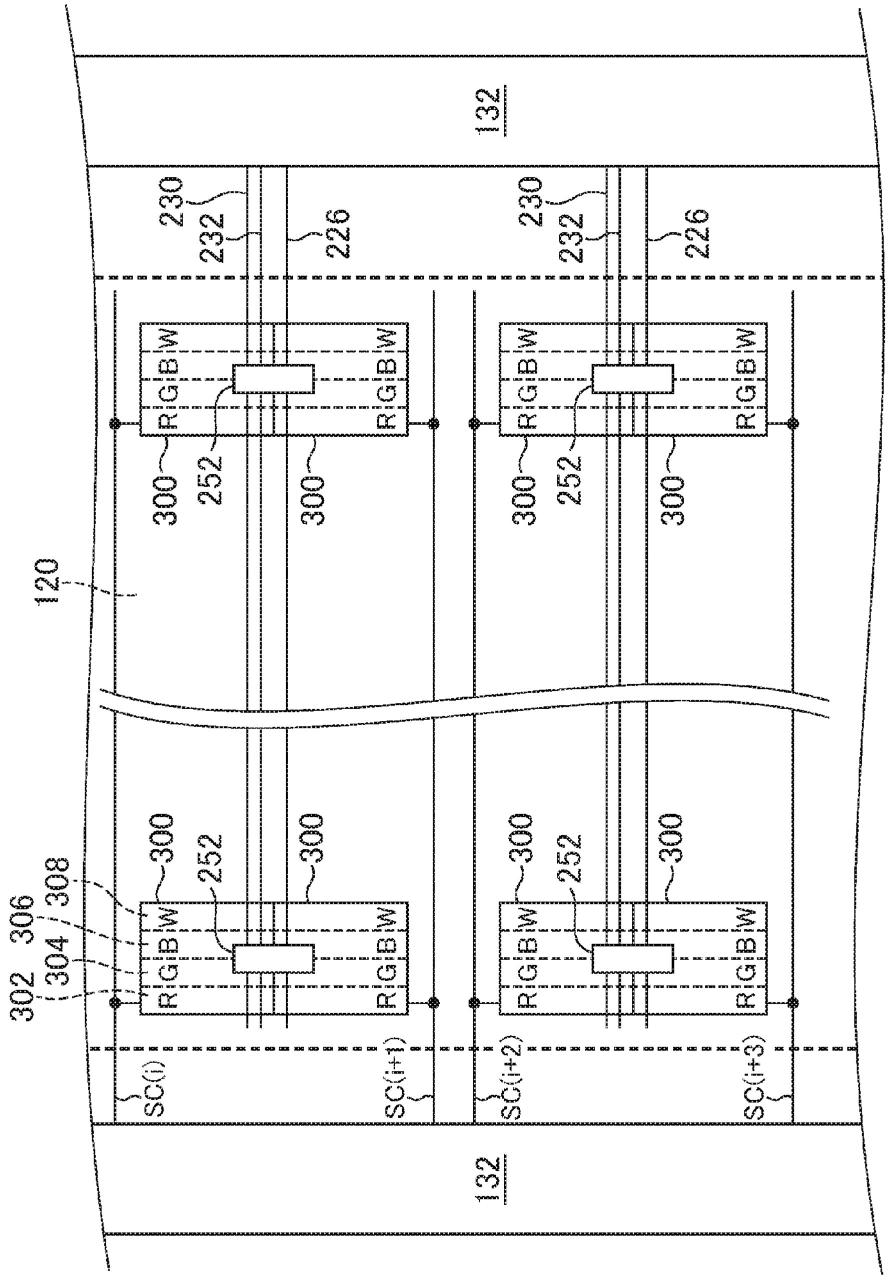
FIG. 18 is a block diagram showing a second modification of the arrangement of an output control circuit in the case where subpixels with the four colors of RGBW are arrayed along a scanning line SC as shown in FIG. 15.

FIG. 18 is a block diagram showing a second modification of the arrangement of the output control circuit 252 in the case where the subpixels forming each pixel are made up of subpixels of the four colors of RGBW arranged along the scanning line SC as shown in FIG. 15. The difference from the block diagram of FIG. 17 is that the output control circuit 252 is shared among the four subpixels of RGBW in each of the i-th row and the (i+1)th row, that is, a total of eight subpixels (two pixels). By thus further sharing the output control circuit 252 among subpixels, the number of output control circuits 252 can be reduced and therefore the circuit scale can be reduced further.

Figure 19:
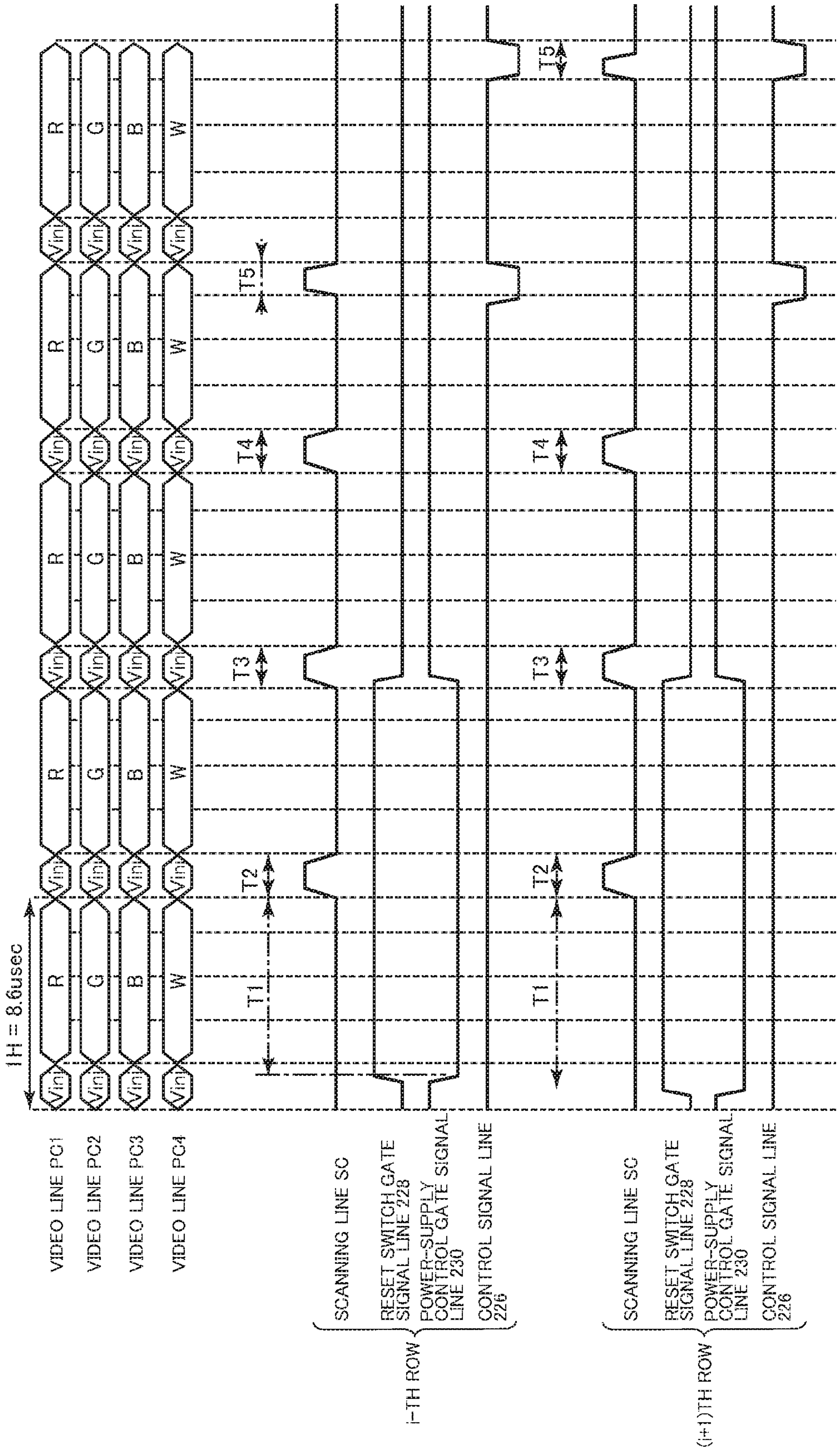
FIG. 19 is a timing chart showing an example of a drive timing in the case where mobility correction is not carried out, in the circuit shown in FIG. 18.

FIG. 19 is a timing chart showing an example of a drive timing in the case where mobility correction is not carried out in the circuit shown in FIG. 18. The timing chart of FIG. 19 is different from the timing chart of FIG. 16 in that since the output control circuit 252 is shared across two rows, other than in the writing period T5 of the row to which the video signal voltage Vsig is written, the signal applied to the control signal line 226 is at low in the writing period T5 of the neighboring row.

Figure 20:
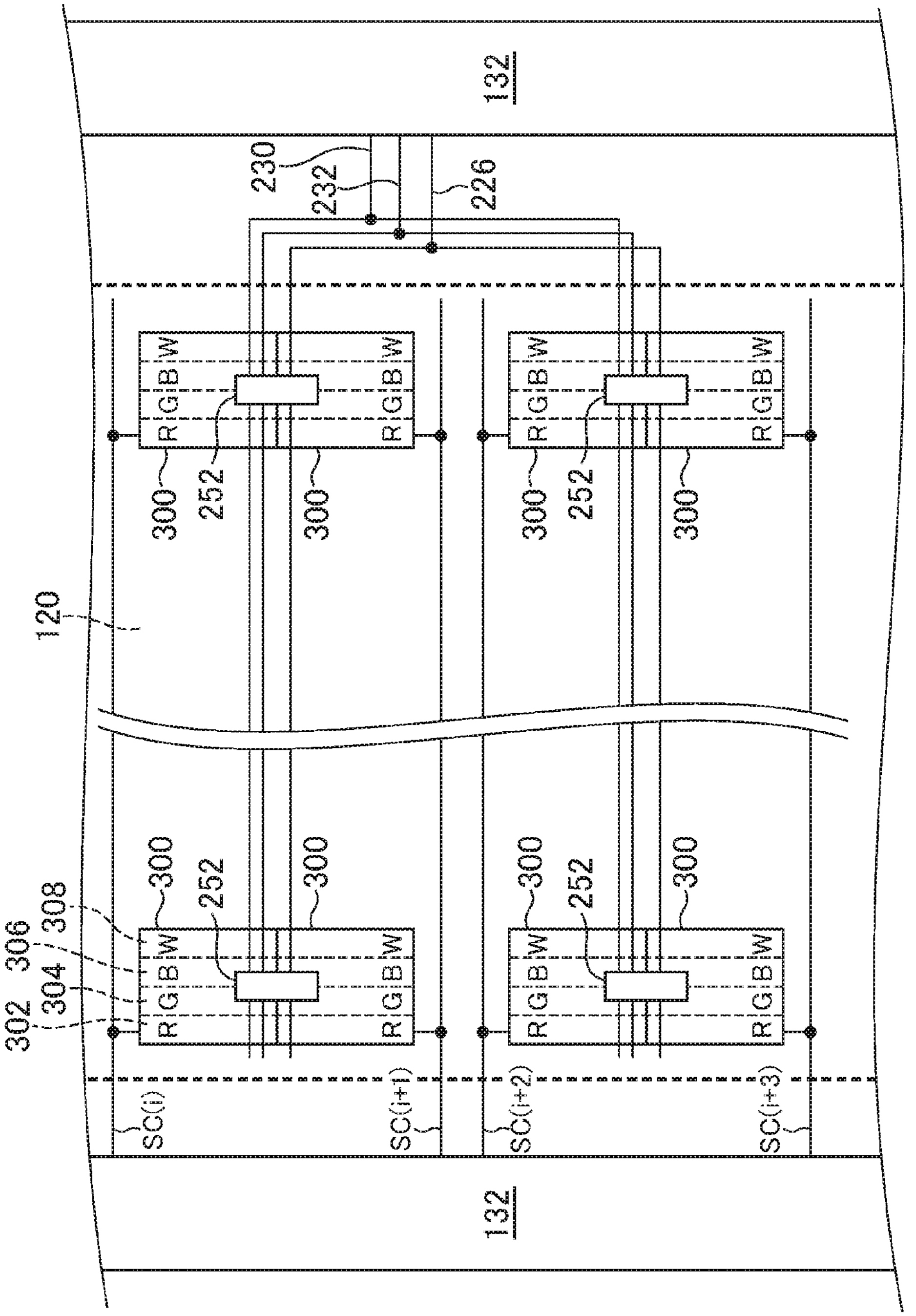
FIG. 20 is a block diagram showing a third modification of the arrangement of an output control circuit in the case where subpixels with the four colors of RGBW are arrayed along a scanning line SC as shown in FIG. 15.

FIG. 20 is a block diagram showing a third modification of the arrangement of the output control circuit 252 in the case where the subpixels forming each pixel are made up of subpixels of the four colors of RGBW arranged along the scanning line SC as shown in FIG. 15. This modification is different from the circuit shown in FIG. 18 in that the scanning line drive circuit 132 outputs one signal to two lines next to each other, of the control signal line 226, the reset signal line 232 and the power-supply control gate signal line 230, and is similar to the circuit of FIG. 18 in other respects. In the circuit of FIG. 18, a signal for two rows of pixels is outputted on each one line already. Therefore, in the circuit of FIG. 20, a signal is outputted on the control signal line 226, the reset signal line 232 and the power-supply control gate signal line 230 substantially corresponding to four rows of pixels. By thus outputting a signal for a plurality of rows at a time, the scanning line drive circuit 132 can be miniaturized and the frame area can be miniaturized further.

The semiconductor layer of the thin film transistor in the foregoing embodiments is not limited to polysilicon and may be made up of amorphous silicon or oxide semiconductor. Each transistor is not limited to the N-channel type and may be the P-channel type. For example, the power supply control transistor 220 and the control transistor 261 can be formed as the P-channel type. Similarly, the reset transistor 218 is not limited to the P-channel type and may be the N-channel type. The shapes and dimensions of the transistors may be determined according to need. The light emitting element 210 of each subpixel is not limited to the organic EL element, and various display elements capable of self-emission can be used.

A person skilled in the art can readily think of various changes and modifications within the conceptual scope of the invention, and such changes and modifications are understood as falling within the scope of the invention. For example, any additions, deletions or design changes of components, or additions, omissions or condition changes of processes, suitably made to each of the embodiments by a person skilled in the art, are included in the scope of the invention as long as the main points of the invention are maintained.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A light emitting element display device comprising:

a light emitting element which emits light at each of a plurality of subpixels forming one pixel;

a drive transistor in which one of a source and a drain is connected to an anode of the light emitting element; and an output control circuit which selectively sets the other of the source and the drain of the drive transistor into one of a state of being connected to a power-supply voltage, a state of being connected to a reset voltage that is a lower voltage than the power-supply voltage, and a high-impedance state of not being connected to any of the power-supply voltage and the reset voltage, wherein the output control circuit is arranged, one per the one pixel.

2. The light emitting element display device according to claim 1, wherein the output control circuit has:

a power supply control transistor which controls output of a power-supply voltage;

a reset signal line connected to an output end of the power supply control transistor; and a control transistor which is arranged between the other of the source and the drain of the drive transistor and the output end, and controls whether to set the other of the source and the drain into a high-impedance state or not, and the light emitting element display device further comprises a reset transistor which applies a reset voltage to the reset signal line.

3. The light emitting element display device according to claim 1, further comprising:

a pixel transistor which controls application of a video signal voltage to a gate of the drive transistor; and a storage capacitor between the gate of the drive transistor and the one of the source and the drain, wherein the output control circuit sets the other of the source and the drain of the drive transistor into a high-impedance state when applying the video signal voltage to the storage capacitor.

4. The light emitting element display device according to claim 1, wherein the output control circuit provides a black insertion period during a light emission period when the light emitting element is made to emit light, the black insertion period being a period in which the other of the source and the drain of the drive transistor is set into a high-impedance state to stop emitting the light.

5. The light emitting element display device according to claim 2, wherein the plurality of subpixels forming the one pixel is made up of four subpixels, and a number of the control transistors arranged for the four subpixels is one of 1, 2 or 4.

6. The light emitting element display device according to claim 5, wherein a number of the power supply control transistors arranged for the four subpixels is one of 1, 2 or 4.

7. The light emitting element display device according to claim 1, wherein the output control circuit is arranged, one per four subpixels arrayed in two rows by two columns.

8. The light emitting element display device according to claim 1, wherein the output control circuit is arranged, one per two of the pixels arrayed in a direction in which a video signal line extends.

9. The light emitting element display device according to claim 2, further comprising:

a plurality of control signal lines extending across a display area and connected to a gate of the control transistor, wherein a same signal is applied to two of the control signal lines that are next to each other, of the plurality of control signal lines.

10. A light emitting element display device comprising:

a plurality of pixel portions which includes a light emitting element and a pixel circuit for supplying a drive current to the light emitting element and which is arranged in a form of a matrix on a substrate;

a plurality of scanning lines arranged along rows where the pixel portions are arrayed;

a plurality of video signal lines arranged along columns where the pixel portions are arrayed;

a plurality of reset lines arranged along the rows where the pixel portions are arrayed;

a high-potential power line and a low-potential power line;

a scanning line drive circuit which supplies a control signal successively to the plurality of scanning lines; and a signal line drive circuit which supplies a video voltage signal to the video signal lines;

wherein the pixel circuit has a drive transistor which is connected in series to the light emitting element between the low-potential power line and the high-potential power line and which has a first terminal connected to the light emitting element, and the pixel circuit further includes a reset control switch which is arranged in series between a second terminal of the drive transistor and the reset line, and a control switch which is arranged in series between the reset control switch and the drive transistor and which controls whether to supply a high-potential voltage from the high-potential power line to the drive transistor or not, and whether to supply a reset signal from the reset line to the drive transistor or not.

11. The light emitting element display device according to claim 10, wherein the pixel circuit includes:

a storage capacitor connected between the first terminal of the drive transistor and a first control terminal of the drive transistor;

a pixel switch which has a third terminal connected to the video signal line, has a fourth terminal connected to the first control terminal of the drive transistor, has a second control terminal connected to the scanning line, and is configured to take in the video voltage signal from the video signal line and store the video voltage signal in the storage capacitor; and an auxiliary capacitor which has one electrode connected to the first terminal of the drive transistor and has the other electrode connected to a constant potential.

12. The light emitting element display device according to claim 11, further comprising an output switch which is provided for each of the reset lines, has a fifth terminal connected to the high-potential power line, has a sixth terminal connected to the reset line, and has a third control terminal connected to a control line.

13. The light emitting element display device according to claim 12, further comprising a register, wherein whether or not the control switch is electrically discontinuous at the time of a black insertion operation in a display operation or when a video voltage signal is written to the storage capacitor, is controlled according to a setting to the register.

14. A light emitting element display device comprising:

subpixels, each of which is arranged in a matrix form and includes a light emitting element which emits light and a drive transistor in which one of a source and a drain is connected to an anode of the light emitting element;

output control circuits, each of which is arranged in a matrix form and selectively sets the other of the source and the drain of the drive transistor into one of a state of being connected to a power-supply voltage, a state of being connected to a reset voltage that is a lower voltage than the power-supply voltage, and a high-impedance state of not being connected to any of the power-supply voltage and the reset voltage; and a peripheral circuit which surrounds the subpixels and the output control circuits and applies the power supply voltage and the reset voltage to the output control circuits, wherein any voltages are not applied to the other of the source and the drain of the drive transistor from the peripheral circuit in the high-impedance state.

15. The light emitting element display device according to claim 14, wherein each of the output control circuits has:

a power supply control transistor which controls output of the power-supply voltage;

a reset signal line connected to an output end of the power supply control transistor; and a control transistor which is arranged between the other of the source and the drain of the drive transistor and the output end, and controls whether to set the other of the source and the drain into the high-impedance state or not, and the peripheral circuit further comprises a reset transistor which applies the reset voltage to the reset signal line.

16. The light emitting element display device according to claim 14, wherein each of the subpixels comprising:

a pixel transistor which controls application of a video signal voltage to a gate of the drive transistor; and a storage capacitor between the gate of the drive transistor and the one of the source and the drain, wherein the output control circuit sets the other of the source and the drain of the drive transistor into the high-impedance state when applying the video signal voltage to the storage capacitor.

17. The light emitting element display device according to claim 14, wherein each of the output control circuits has a period in which the other of the source and the drain of the drive transistor is set into the high-impedance state, during a light emission period when the light emitting element is made to emit light.

18. The light emitting element display device according to claim 15, wherein one pixel is made up of four subpixels, and a number of the control transistors arranged for the four subpixels is one of 1, 2 or 4.

19. The light emitting element display device according to claim 18, wherein a number of the power supply control transistors arranged for the four subpixels is one of 1, 2 or 4.

20. The light emitting element display device according to claim 14, wherein the output control circuit is arranged, one per four subpixels arrayed in two rows by two columns.

21. The light emitting element display device according to claim 14, wherein pixels are arranged in a matrix form, one per a predetermined number of the subpixels, and the output control circuit is arranged, one per the one pixel.

22. The light emitting element display device according to claim 14, wherein the output control circuit is arranged, one per two of the subpixels arrayed in a direction in which a video signal line extends.

23. The light emitting element display device according to claim 15, further comprising a plurality of control signal lines extending across a display area and connected to a gate of the control transistor, wherein a same signal is applied to two of the control signal lines that are next to each other, of the plurality of control signal lines.

* * * * *